(12) United States Patent
Cote

(10) Patent No.: US 9,038,570 B2
(45) Date of Patent: May 26, 2015

(54) TUBE BIRD FEEDER

(71) Applicant: Paul L. Cote, Lac Brome (CA)

(72) Inventor: Paul L. Cote, Lac Brome (CA)

(73) Assignee: PLC Patents and Trademarks Inc., Lac Brome, Quebec (CA)

( * ) Notice: Subject to any disclaimer, the term of this patent is extended or adjusted under 35 U.S.C. 154(b) by 0 days.

(21) Appl. No.: 13/986,805

(22) Filed: Jun. 7, 2013

(65) Prior Publication Data

US 2014/0360435 A1    Dec. 11, 2014

(51) Int. Cl.
*A01K 39/01*    (2006.01)
*A01K 39/012*    (2006.01)

(52) U.S. Cl.
CPC ........... *A01K 39/0106* (2013.01); *A01K 39/012* (2013.01)

(58) Field of Classification Search
USPC ....................... 119/57.8, 52.2, 57.9
See application file for complete search history.

(56) References Cited

U.S. PATENT DOCUMENTS

| | | | | |
|---|---|---|---|---|
| 3,568,641 | A | * | 3/1971 | Kilham ...................... 119/57.8 |
| D351,691 | S | * | 10/1994 | Lipton ...................... D30/127 |
| 7,739,982 | B2 | * | 6/2010 | Cote ........................ 119/57.9 |
| 8,434,425 | B2 | * | 5/2013 | Cote ........................ 119/57.9 |
| 2007/0227453 | A1 | * | 10/2007 | Puckett et al. ............ 119/57.8 |
| 2007/0266950 | A1 | * | 11/2007 | Walsh ...................... 119/57.8 |
| 2011/0126771 | A1 | * | 6/2011 | Cote ........................ 119/52.3 |

* cited by examiner

*Primary Examiner* — Yvonne Abbott-Lewis
(74) *Attorney, Agent, or Firm* — Eric Fincham

(57) ABSTRACT

A tube bird feeder comprising a seed tube having a side wall and at least one feed opening in the side wall, a top ring mounted on a top marginal edge of the seed tube, a cover removably engaged with the top ring, at least one perch mounted on the seed tube proximate the feed opening, and a base member removably secured to the seed tube adjacent the bottom marginal edge, the base portion having a protrusion engaging with an aperture in the seed tube proximate the bottom marginal edge.

20 Claims, 32 Drawing Sheets

TUBE BIRD FEEDER

FIELD OF THE INVENTION

The present invention relates to bird feeders, and more particularly relates to improvements in a tube type bird feeder.

BACKGROUND OF THE INVENTION

Tube type bird feeders are well known in the art. They basically have a seed retaining container of a tubular configuration which is usually transparent in nature. A base seals the bottom while a cover is provided. The cover can be removed so as to provide access to the seed container for filling of the same. Normally, one or more perches are provided proximate the one or more seed access openings in the seed container.

Most tube bird feeders are designed to be as inexpensive as possible. They are conventionally manufactured in a manner so as to not encourage disassembly of the same. However, in so doing, this can cause problems. One of the problems associated with all types of bird feeders is cleanliness. Unless a proper design is provided, the seed will, over a period of time, become mouldy. It is also subject to contamination by bird droppings. Without proper care, this can lead to illness among the bird population using the feeder.

SUMMARY OF THE INVENTION

It is an object of the present invention to provide an improved tube type of bird feeder wherein various components may be removed and wherein the bird feeder is preferably rotatable.

According to one aspect of the present invention there is provided a tube bird feeder comprising a seed tube having a side wall, at least one feed opening in the side wall, the side wall having a top marginal edge and a bottom marginal edge, a top ring mounted on the top marginal edge, a cover removably engaged with the top ring, at least one perch mounted on the seed tube wall proximate the feed opening, and a base member removably secured to the seed tube adjacent the bottom marginal edge, the base member having a protrusion, the protrusion engaging with an aperture formed in the seed tube wall proximate the bottom marginal edge.

A traditional tube bird feeder comprises a hollow tube having feed access openings therein. Perches are usually a pair of round like elements which pass through the tube and extend outwardly. They are secured in position by mechanical means. A base prevents the seed from exiting and it is also usually secured in place by mechanical fasteners. The cover arrangement will again usually comprise a wire member which will engage with the hollow tube either directly or indirectly. The cover slides on the wire member and access to the tube is gained by tilting the wire member to the side while the cover is elevated.

The conventional tube bird feeder is not easily disassembled and tools are usually required. The bird feeder of the instant invention overcomes many of the disadvantages of the known tube bird feeder and can be assembled and disassembled without the use of tools.

In greater detail, the bird feeder of the present invention may utilize a conventional seed tube with an open top and an open bottom. Conventionally, the seed tubes are formed of a plastic material and are transparent although other materials can be utilized.

The seed tube is provided with at least one feed access opening and in a preferred embodiment, has two seed access openings which are diametrically opposed. Each seed access opening preferably has a perch mounted proximate thereto to enable a bird to perch while feeding.

The bird feeder will also have a cover which is designed to seal the open top end.

The cover is preferably removable and retained such that access may be had to the interior of the tube for filling of the same. Most covers utilized for tube feeders are held in a non rotatable manner. In a preferred embodiment, the bail holding the bird feeder through the cover is mounted such that the bird feeder can rotate about the bail.

The base member is removably secured to the seed tube adjacent a bottom marginal edge of the tube. In a preferred embodiment, the base member has a protrusion which will engage with an aperture formed in the seed tube proximate the aforementioned bottom marginal edge.

The base member is preferably formed of an upper base portion and a lower base portion. They are retained together in a non rotatable manner. The upper base portion will include a pair of half walls defining the top thereof and upon which the seed in the seed tube will be supported. Preferably the two half walls have apertures therein to permit drainage and ventilation.

The locking of the base member to the seed tube by the protrusion relies on the flexibility of the seed tube. The protrusion is such that the seed tube can fit within and be slidable thereover due to the shape of the front or face wall of the protrusion as will be described in greater detail hereinbelow.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
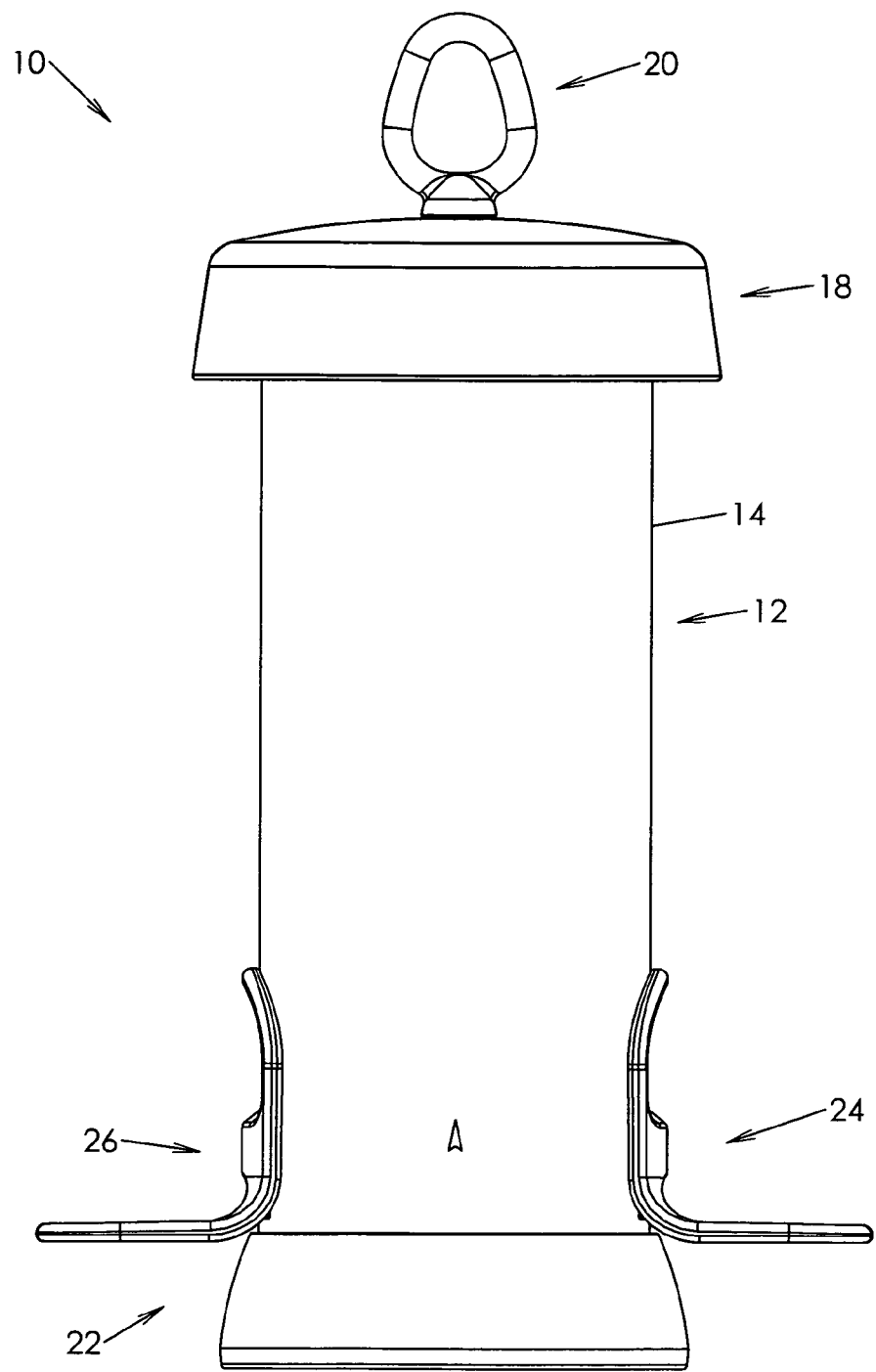
FIG. 1 is a side elevational view of a bird feeder according to the present invention.
Figure 2:
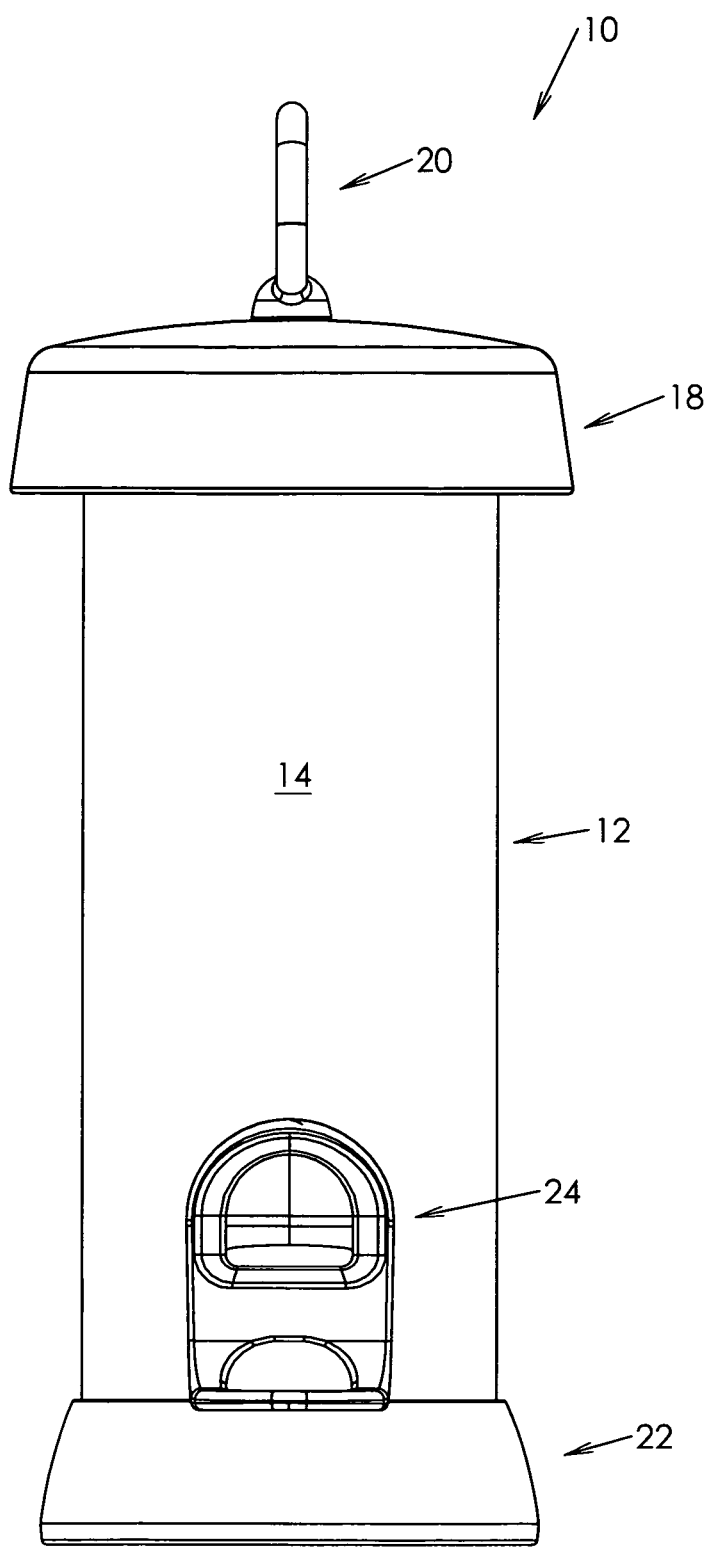
FIG. 2 is a front elevational view thereof.
Figure 3:
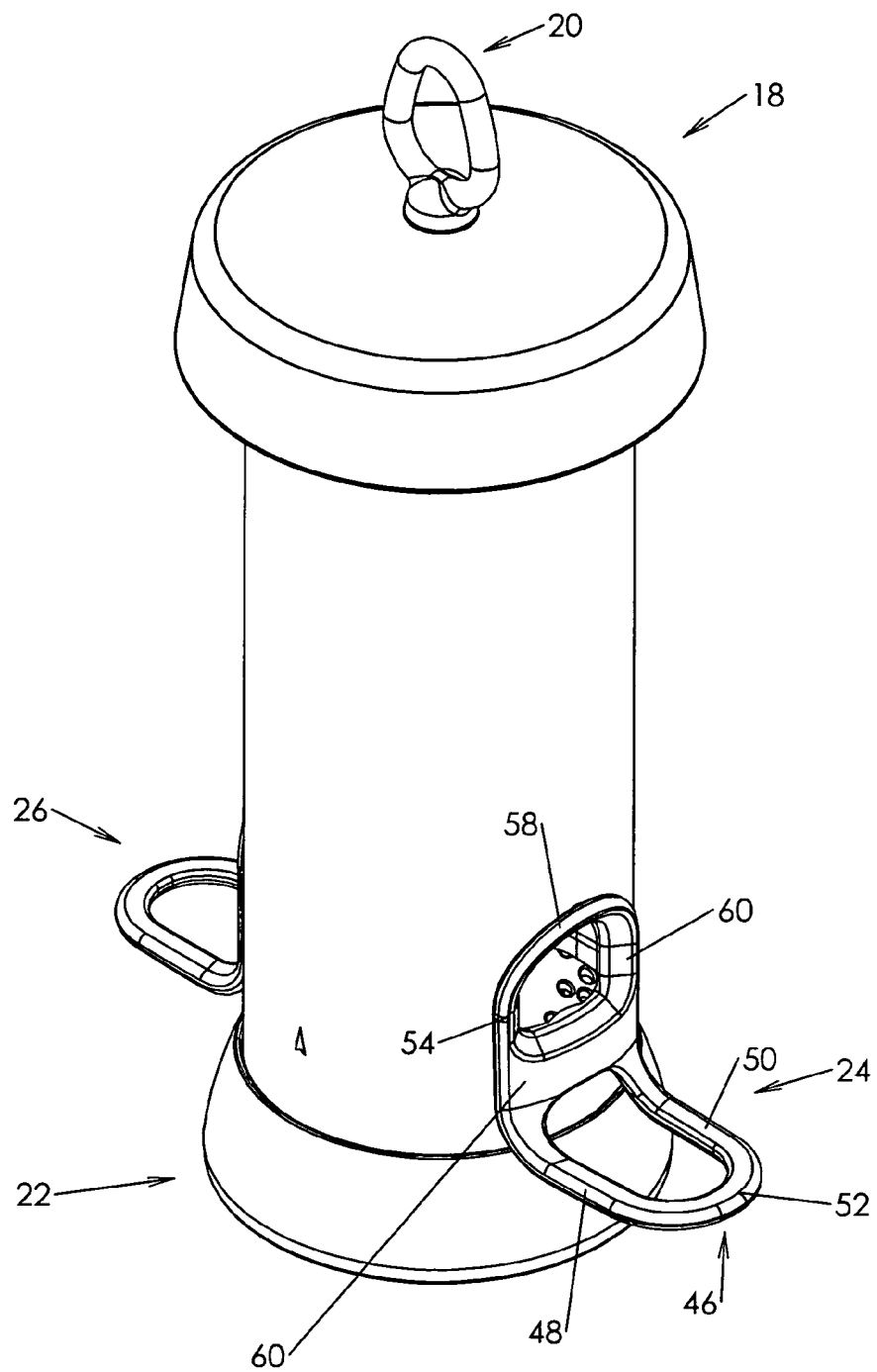
FIG. 3 is a perspective view thereof.
Figure 4:
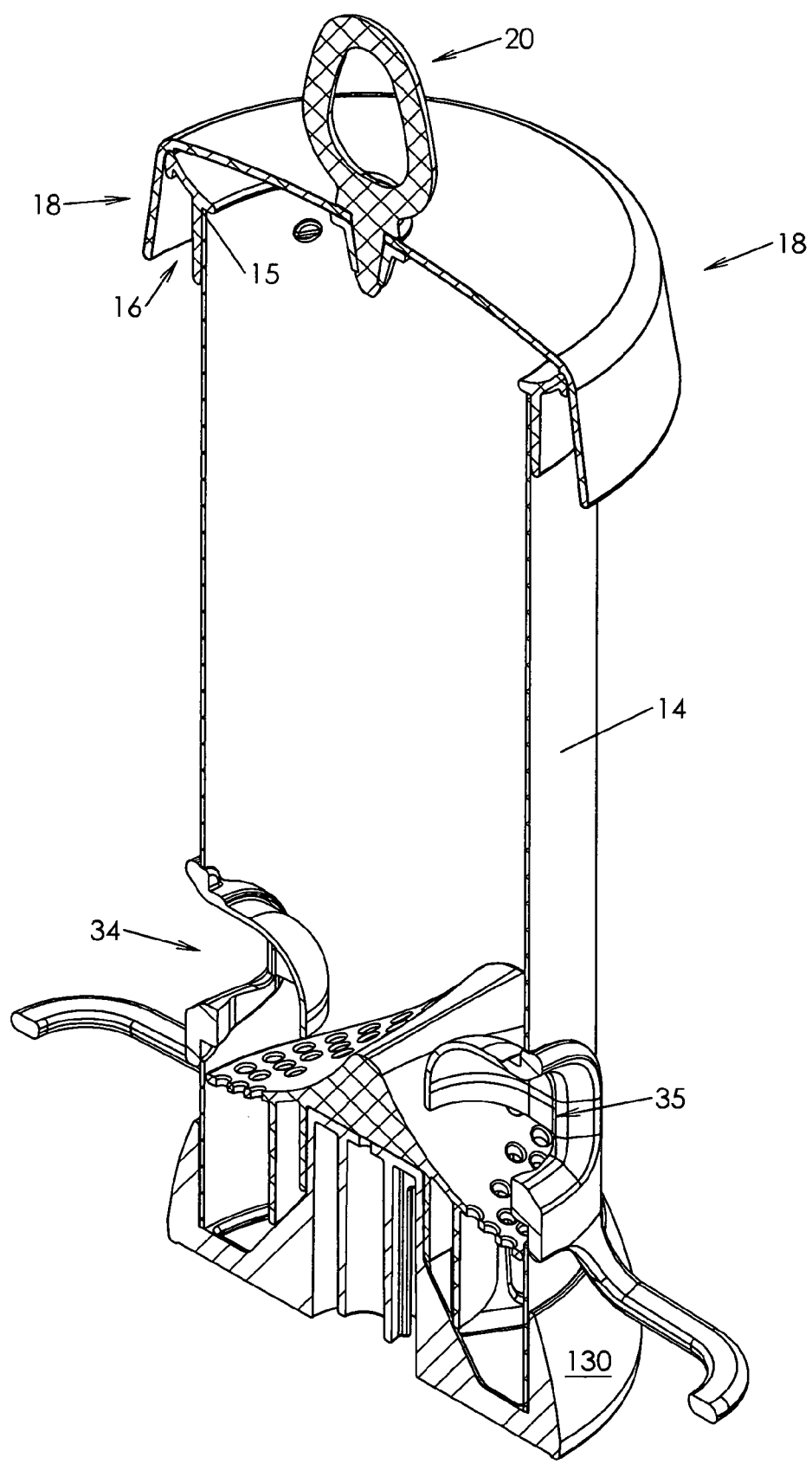
FIG. 4 is a perspective sectional view thereof.
Figure 5:
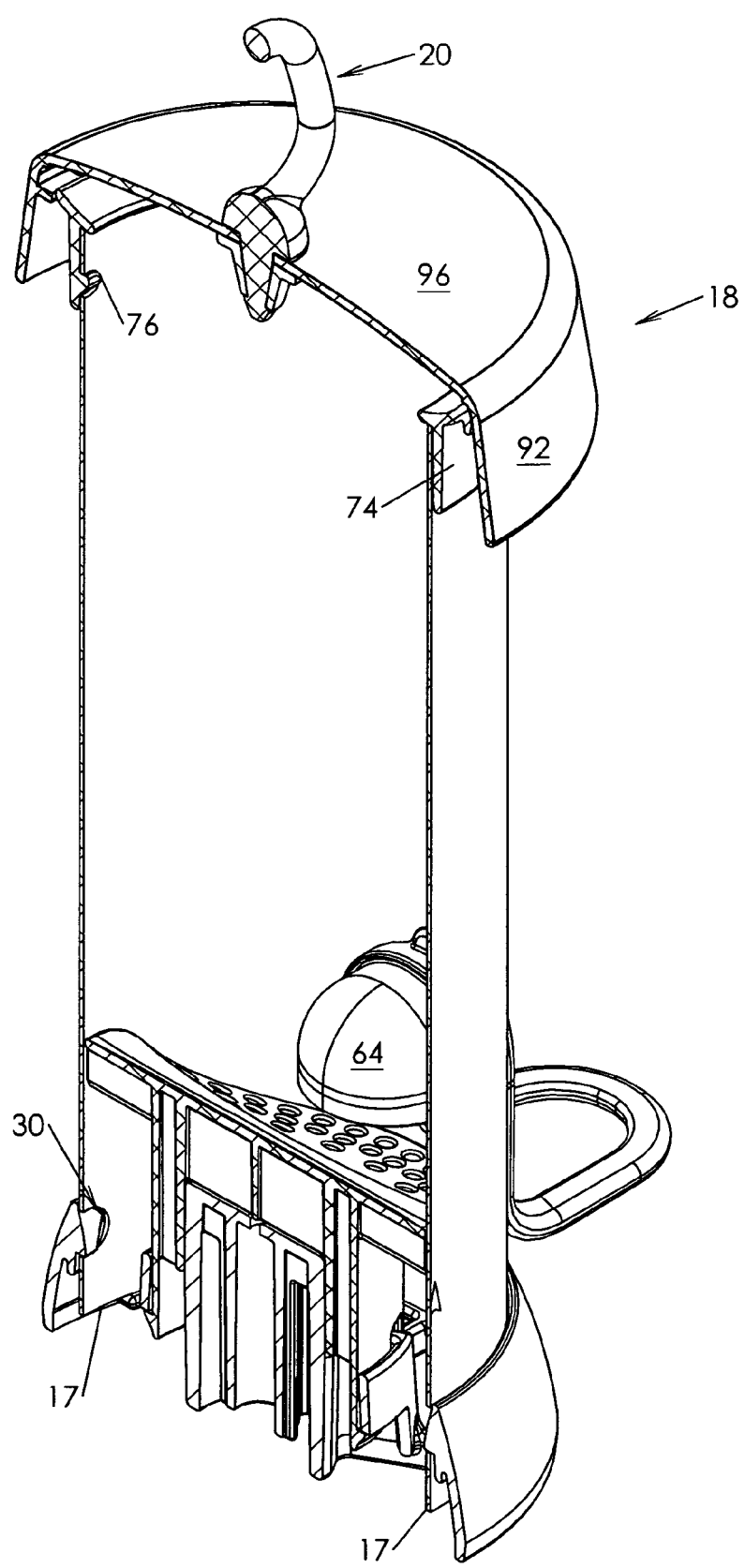
FIG. 5 is a further perspective sectional view thereof.
Figure 6:
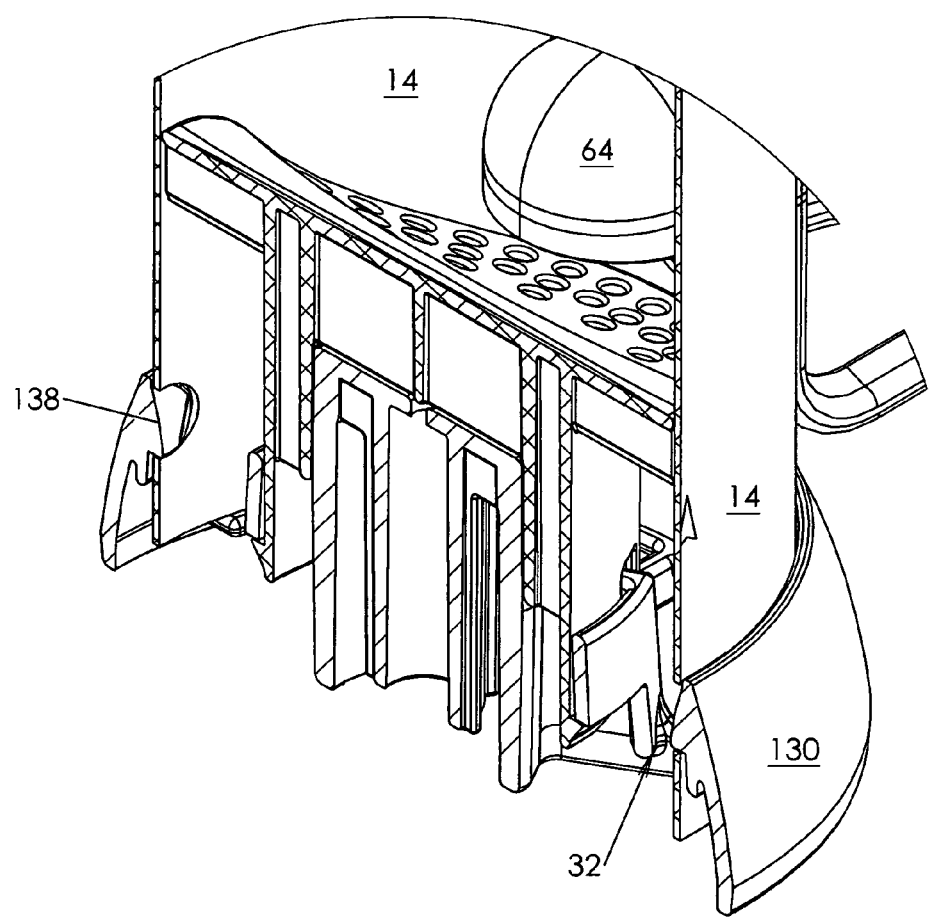
FIG. 6 is a perspective sectional view of the bottom portion of the bird feeder.
Figure 7:
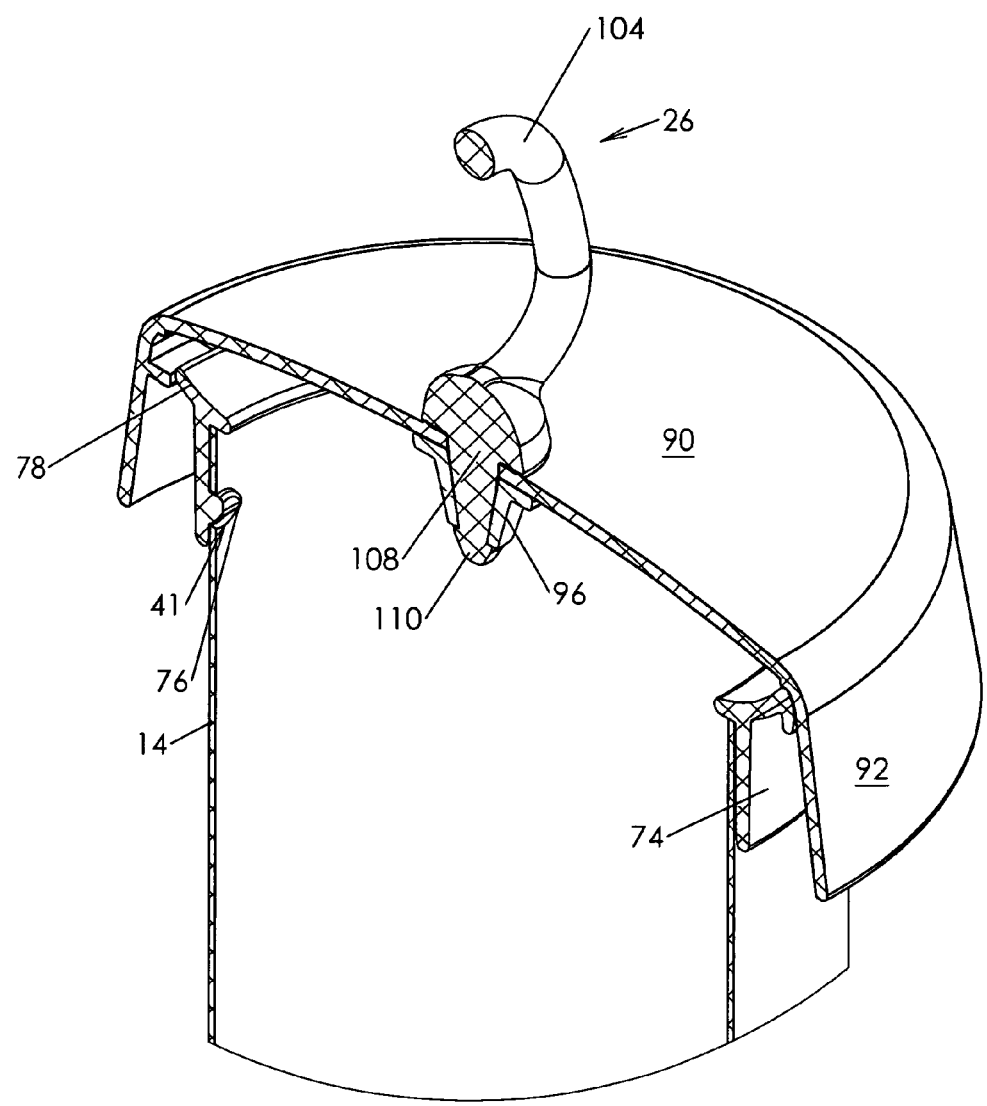
FIG. 7 is a perspective sectional view of the upper portion of the bird feeder.
Figure 8:
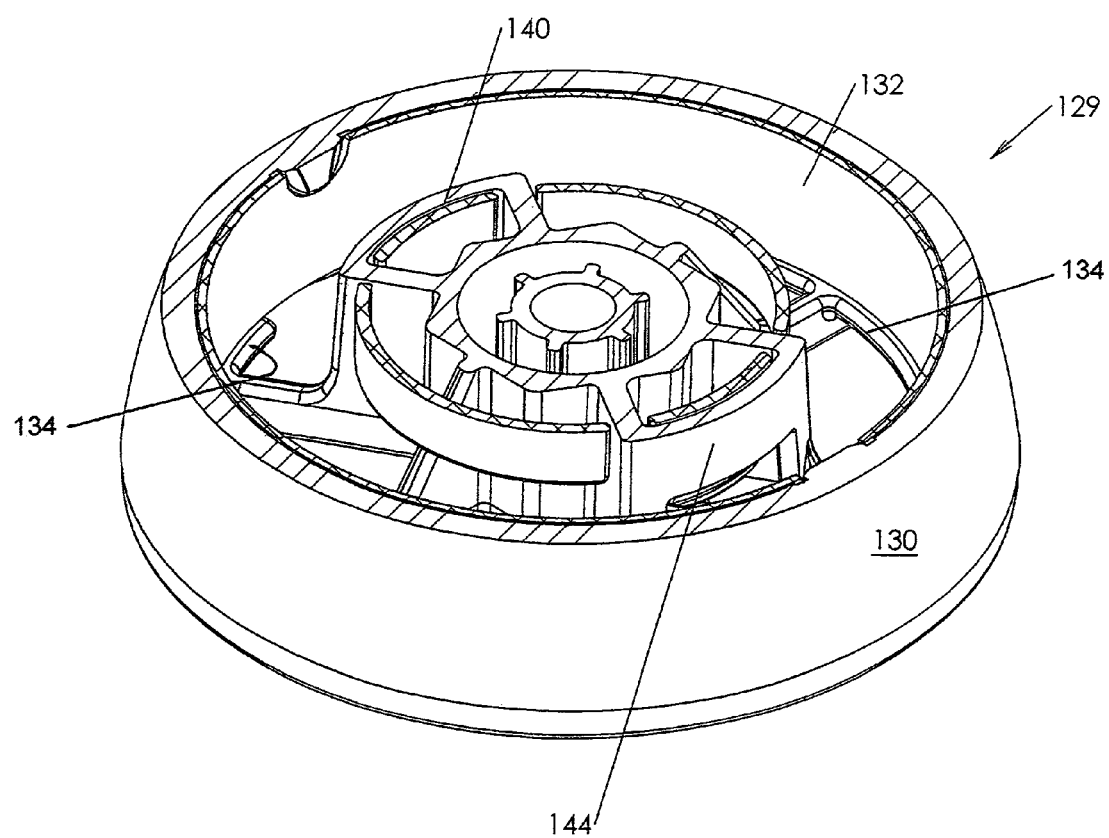
FIG. 8 is a perspective view of the base member of the bird feeder.
Figure 9:
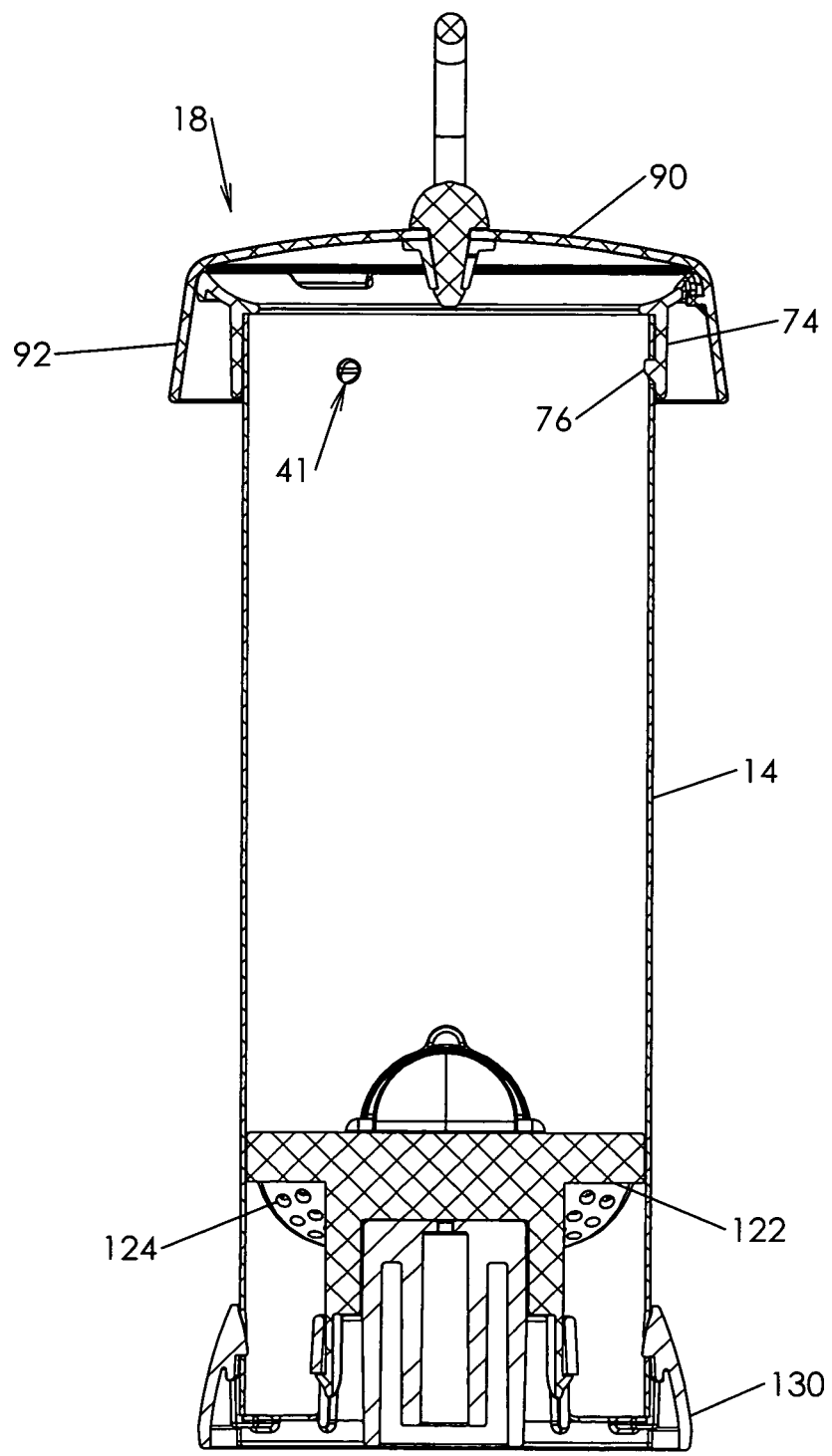
FIG. 9 is a bottom plan view thereof.
Figure 10:
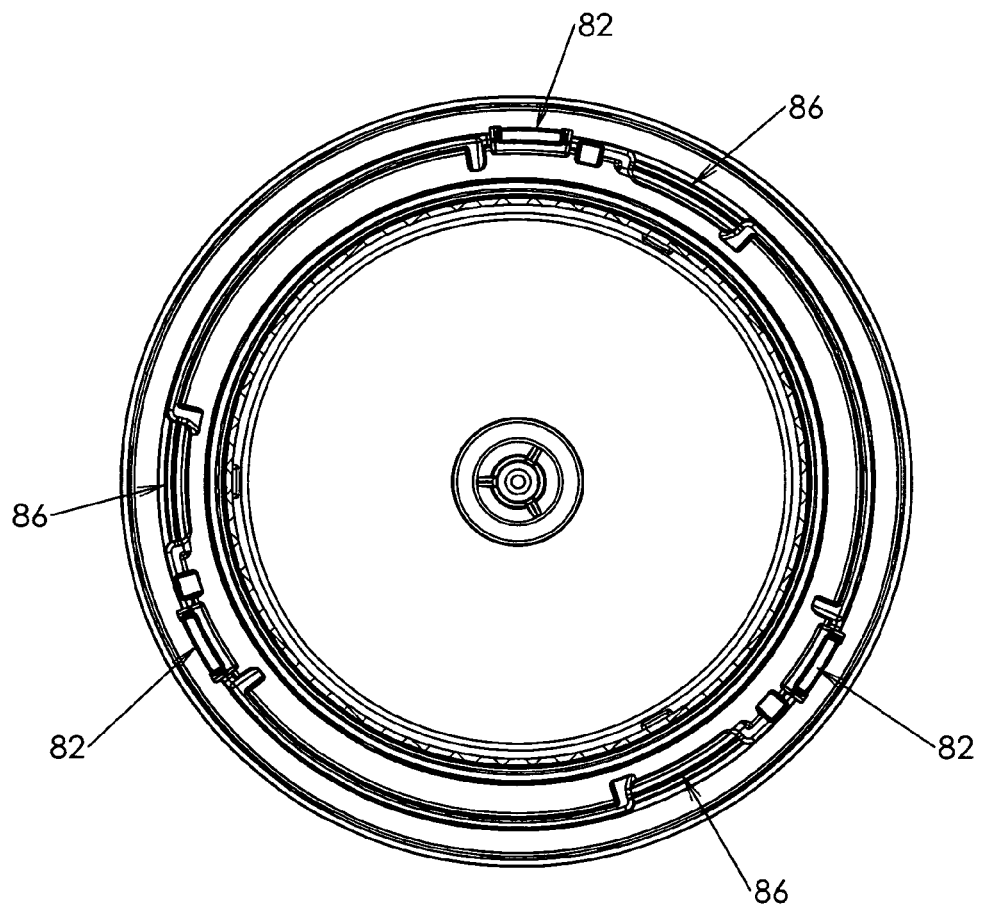
FIG. 10 is a side elevational sectional view of the bird feeder.
Figure 11:
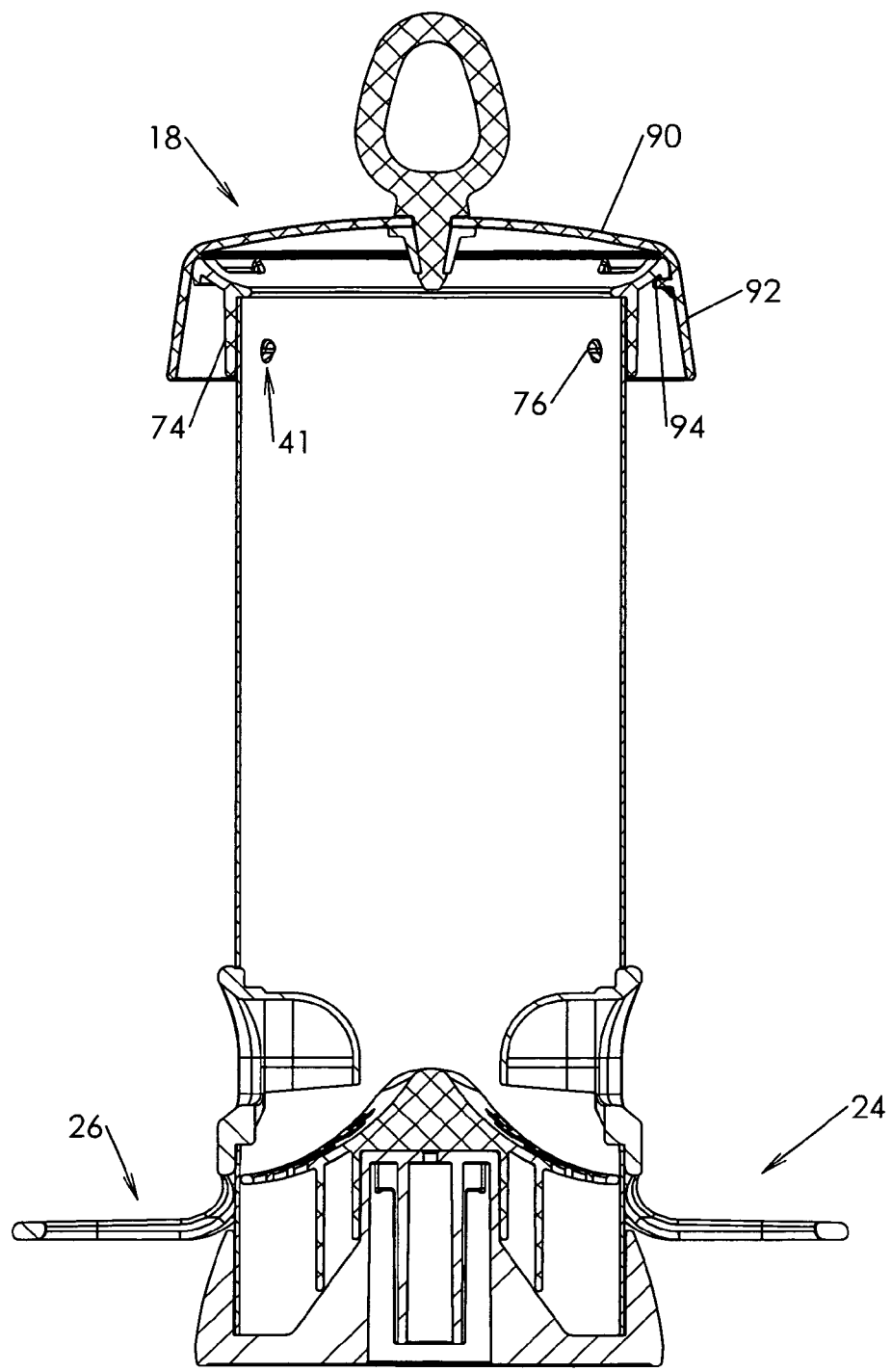
FIG. 11 is a further elevational sectional view thereof.
Figure 12:
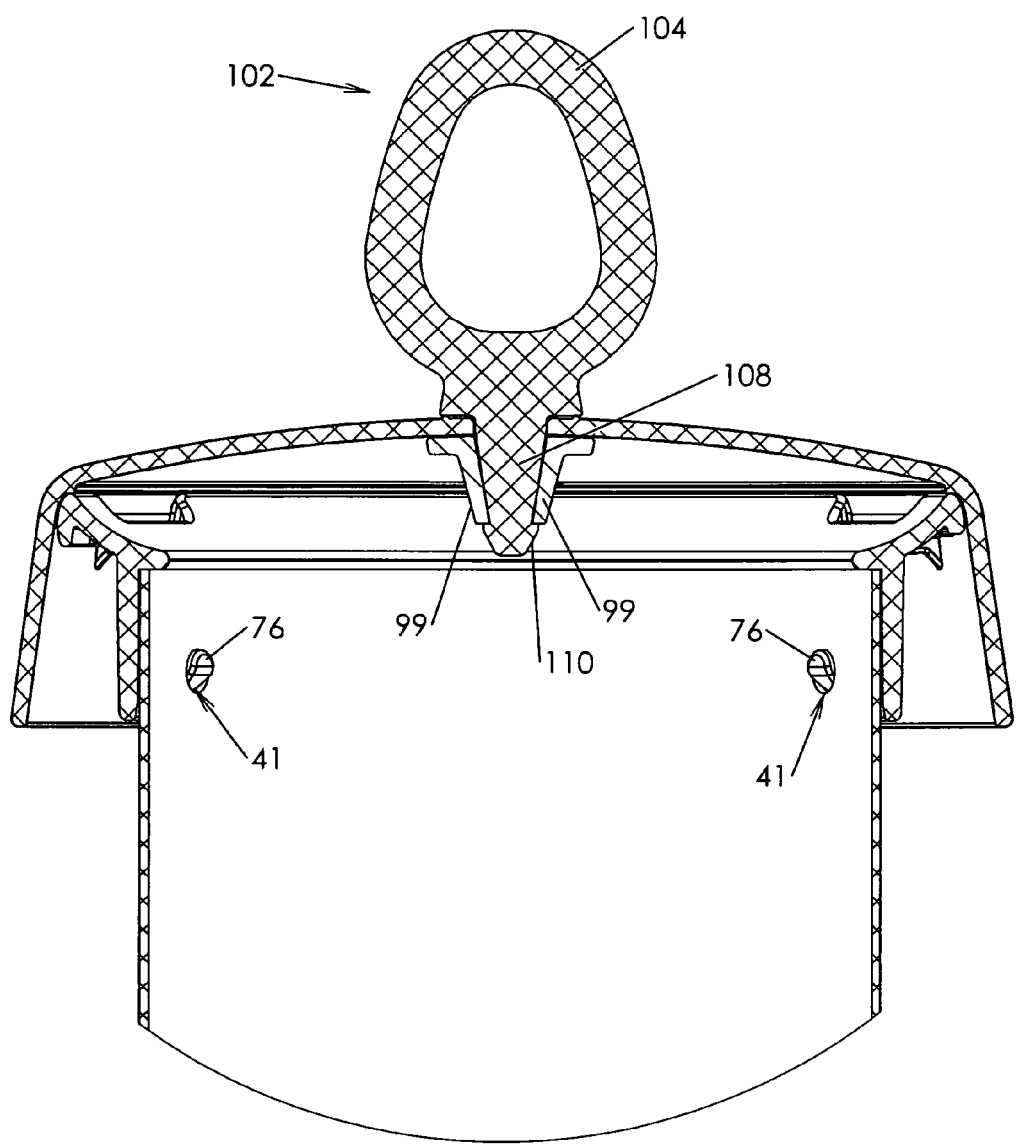
FIG. 12 is a cross-sectional view of the upper portion of the bird feeder.
Figure 13:
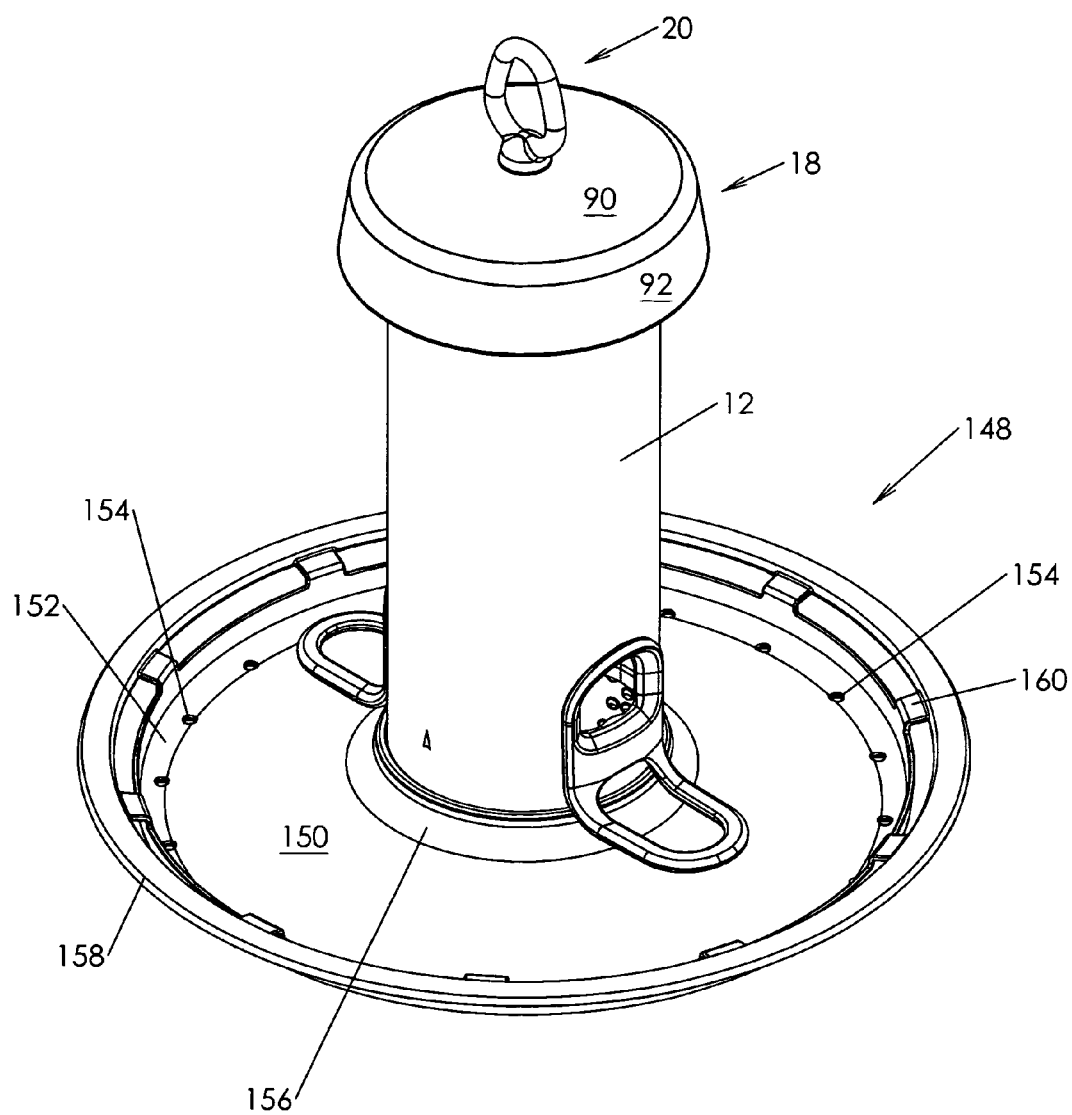
FIG. 13 is a perspective view of the bird feeder with a seed tray being secured thereto.
Figure 14:
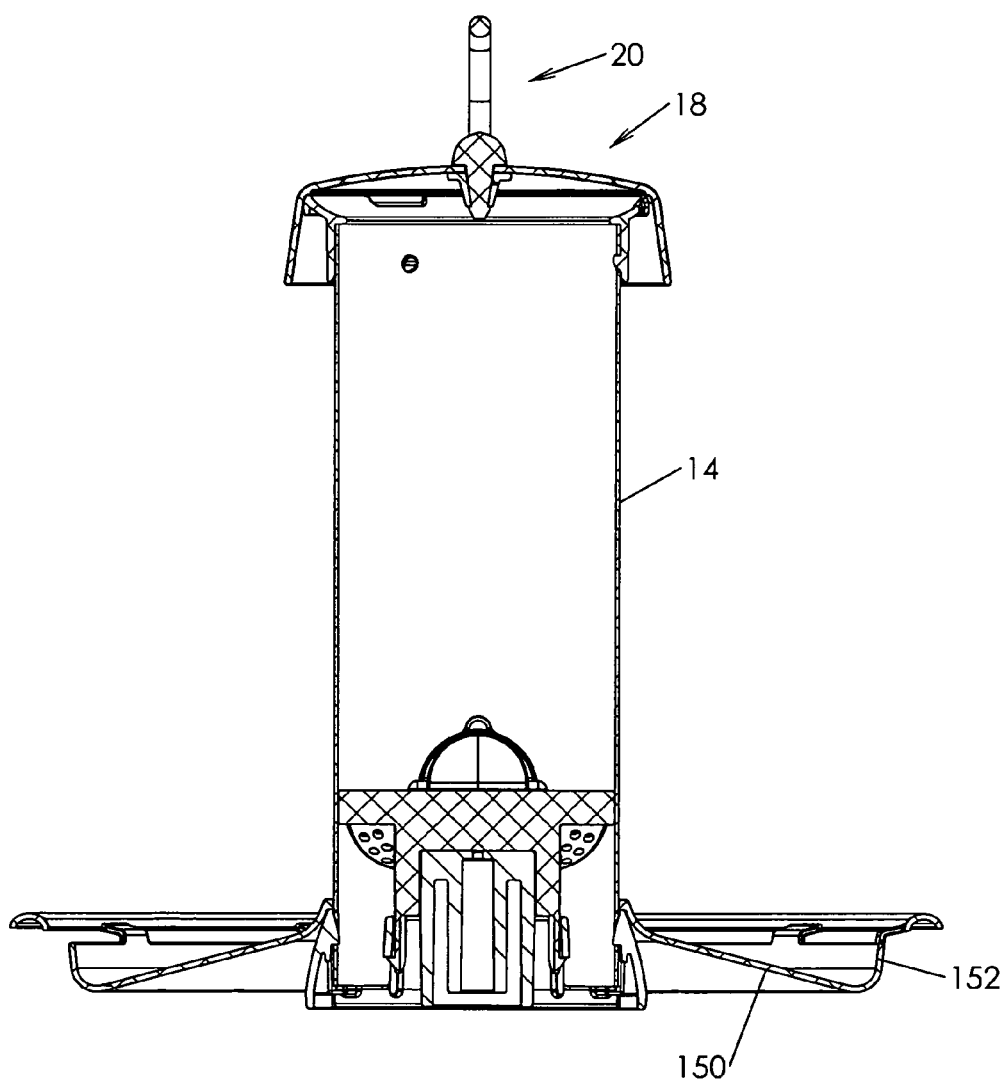
FIG. 14 is a side sectional view of the bird feeder of FIG. 13.
Figure 15:
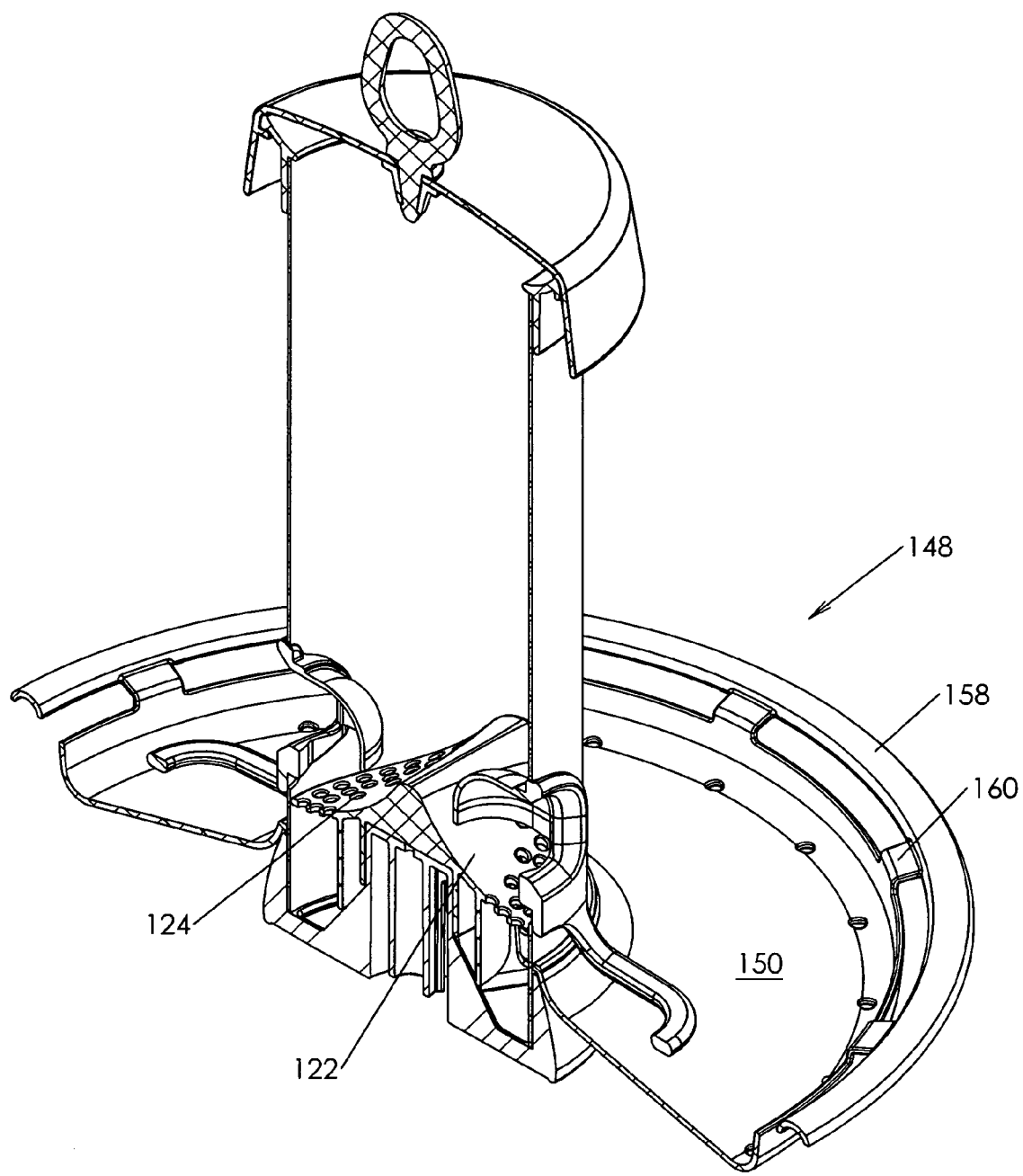
FIG. 15 is a perspective sectional view thereof.
Figure 16:
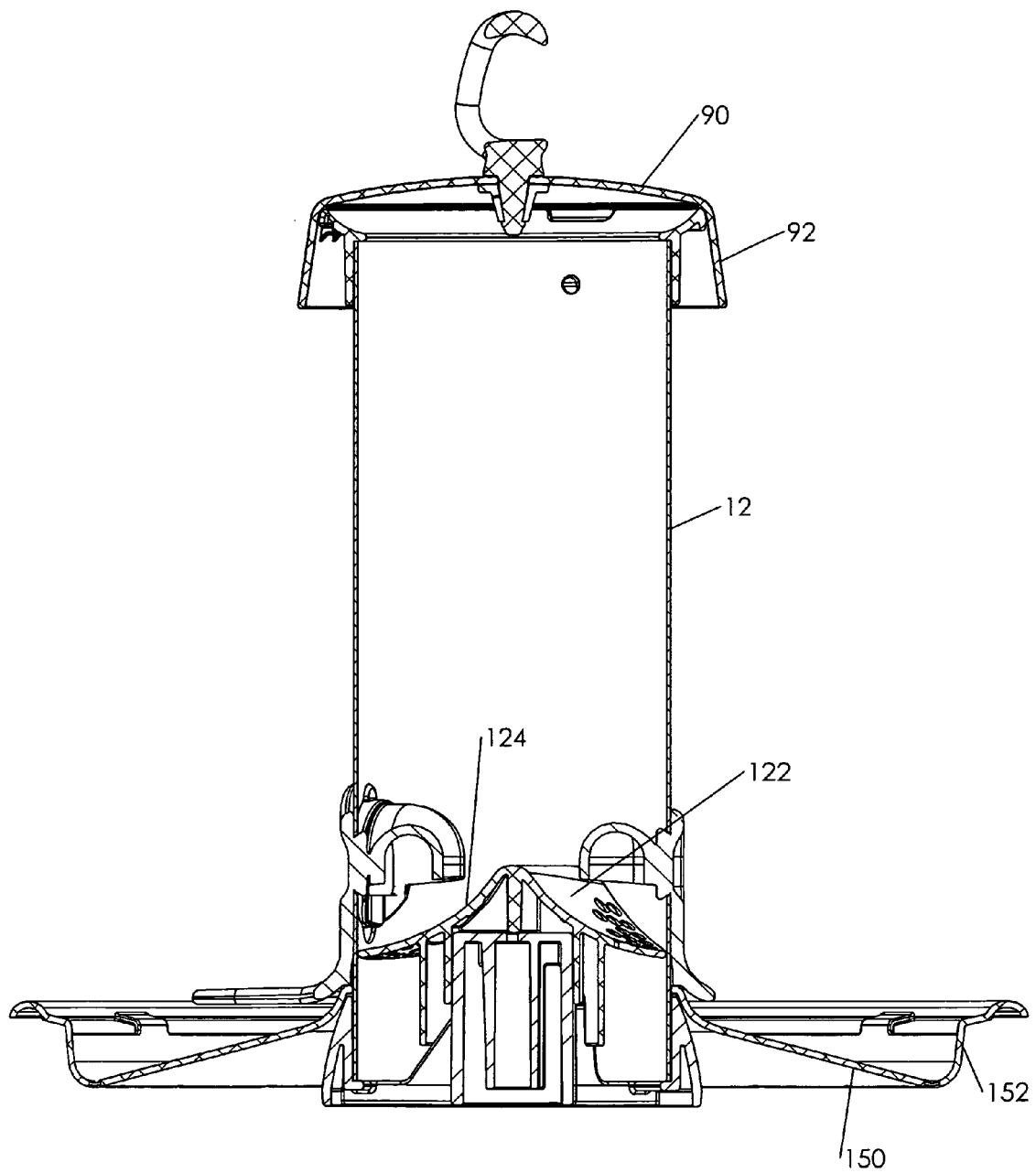
FIG. 16 is a side sectional view thereof.
Figure 17:
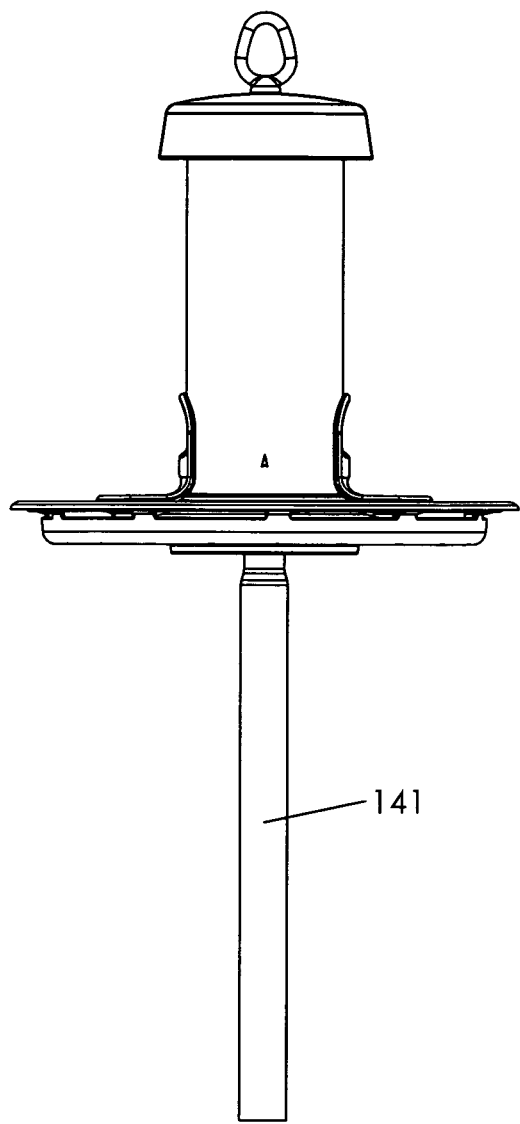
FIG. 17 is a side elevational view illustrating the bird feeder attached to a supporting post.
Figure 18:
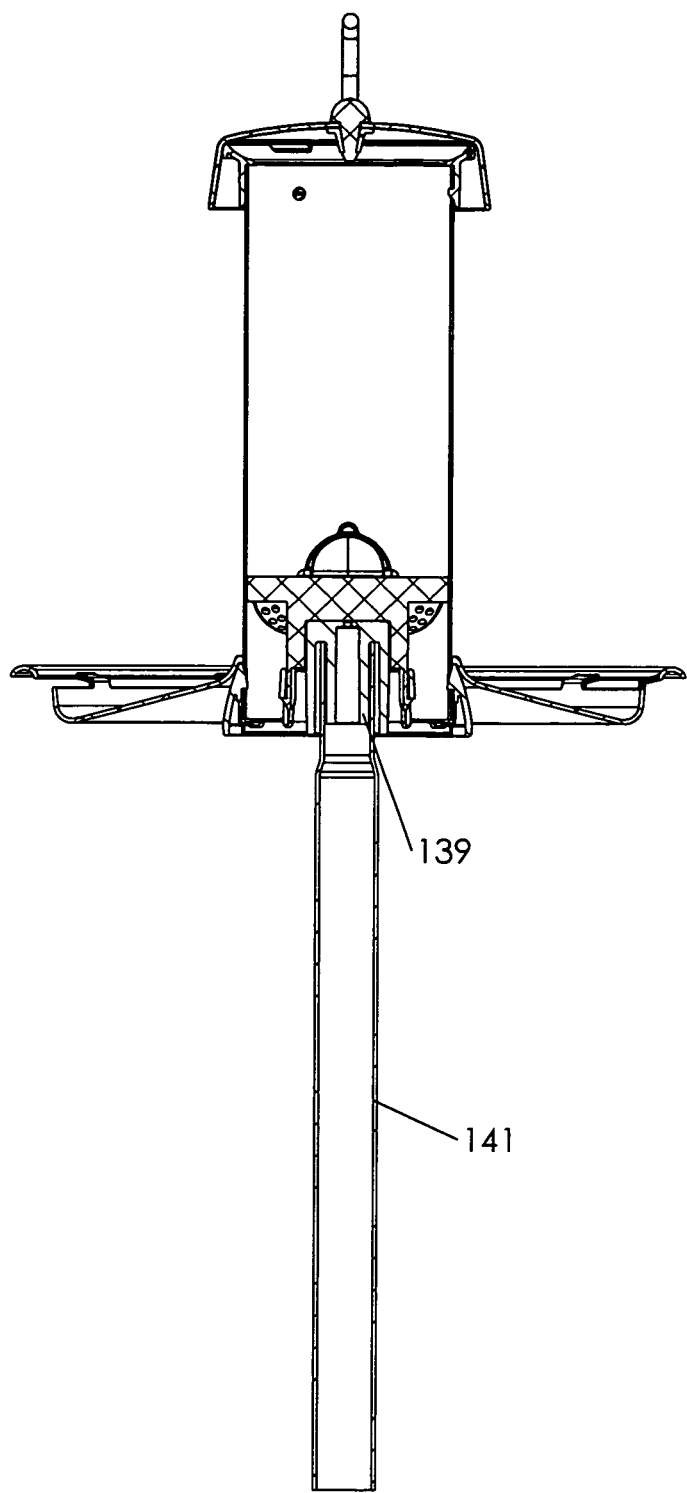
FIG. 18 is a side sectional view thereof.

Referring to the drawings in greater detail and by reference characters thereto, there is provided a bird feeder generally designated by reference numeral 10. Bird feeder 10 is of the so-called "tube type" and includes a tubular body 12 having a side wall 14. Side wall 14 has an upper marginal edge generally designated by reference numeral 15 and a lower marginal edge generally designated by reference numeral 17.

Extending about upper marginal edge 15 is a top ring generally designated by reference numeral 16. A cover is generally designated by reference numeral 18 while a bail or hanger is designated by reference numeral 20. Bird feeder 10 also includes a base member generally designated by reference numeral 22. A first perch 24 is mounted on one side of side wall 14 while a second perch 26 is mounted so as to be diametrically opposed to first perch 24.

Side wall 14 has, proximate to lower marginal edge 17, a first side aperture 30 and a second side aperture 32.

Side wall 14 also has a pair of feed access openings 34, 35. Since both are substantially identical, only one will be described herein. Thus, first feed access opening 34 is demarcated by a circular line 36 into which there is formed an upper cutout or recess 38 and a lower cutout or recess 40. Proximate upper marginal edge 15, there are provided a plurality of small apertures 41.

Each of perches 24, 26 are substantially identical and thus, only one will be described in detail herein. Perch 24 has an overall L-shaped frame; the bottom of the L-shaped frame is a U-shaped portion generally designated by reference numeral 46. U-shaped portion includes a first leg 48, a second leg 50, and a joinder section 52.

The upper portion of L-shaped frame 44 is also somewhat U-shaped and includes a first side leg 54 and a second side leg 56. At the bottom there is a solid central portion 60.

It will be noted that there is provided a reinforced section 62 from which extends a baffle 64. A first lug or projection 66 is located adjacent reinforced section 62 and baffle 64. Similarly, there is a second lug 68 on the diametrically opposite side thereof. A locking lug 70 is provided at the top of joinder section 58 for reasons which will become apparent hereinbelow.

Figure 22:
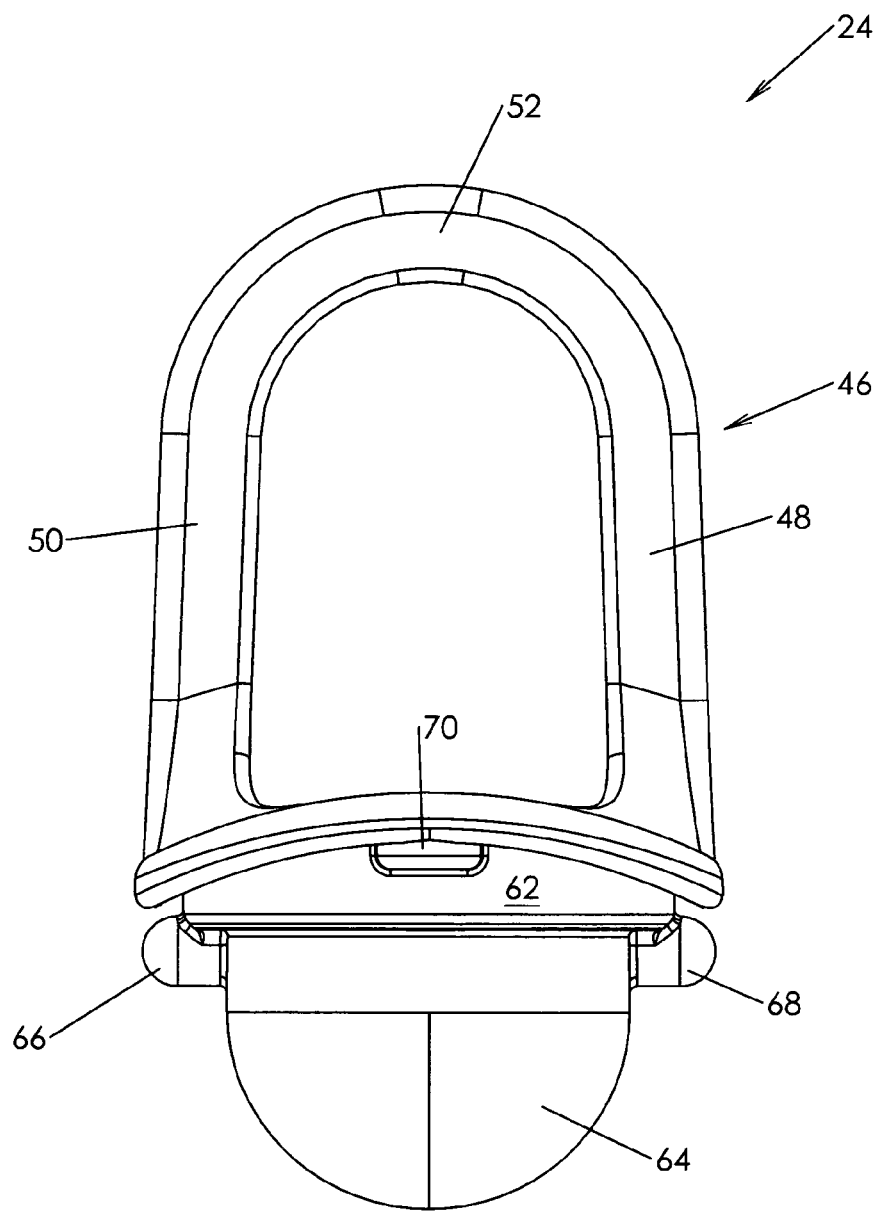
FIG. 22 is a top plan view of the perch.
Figure 23:
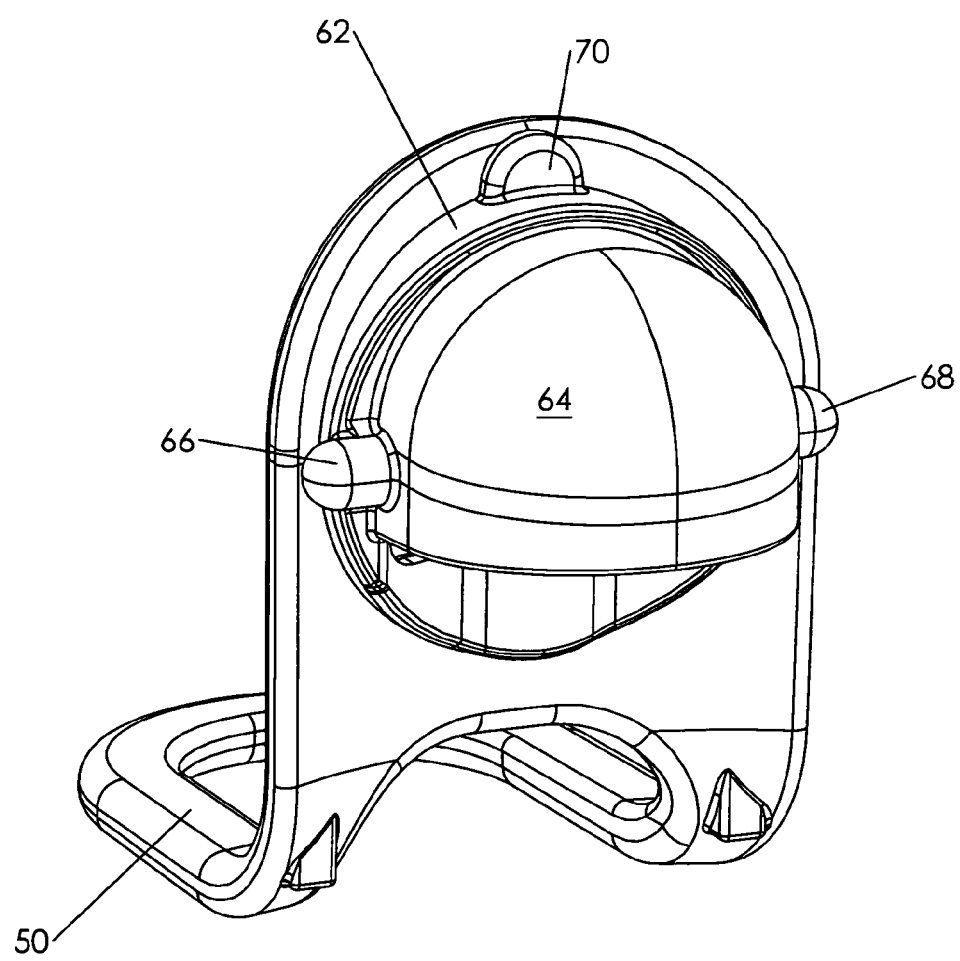
FIG. 23 is a rear perspective view thereof.
Figure 24:
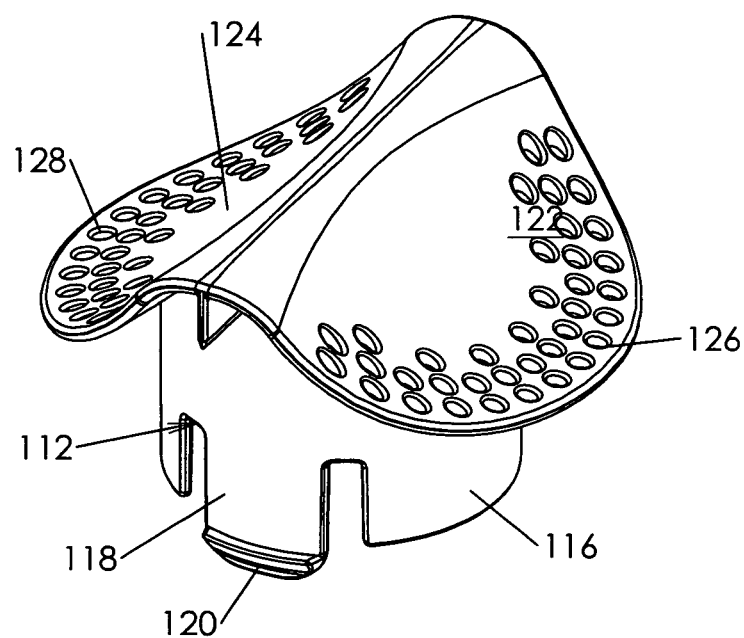
FIG. 24 is a perspective view of the two pieces forming the base.
Figure 24:
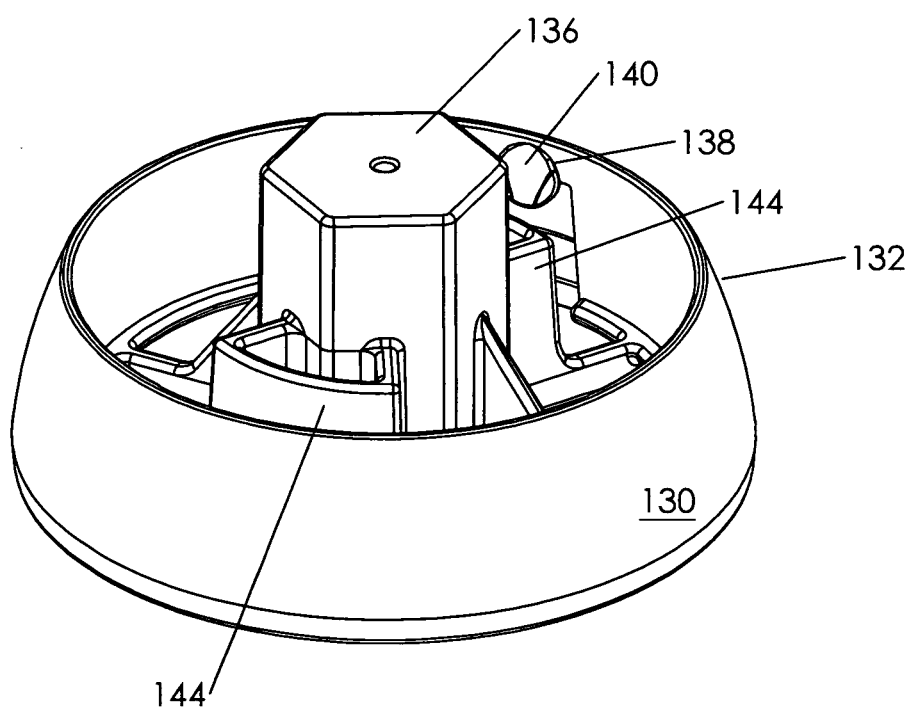
Figure 25:
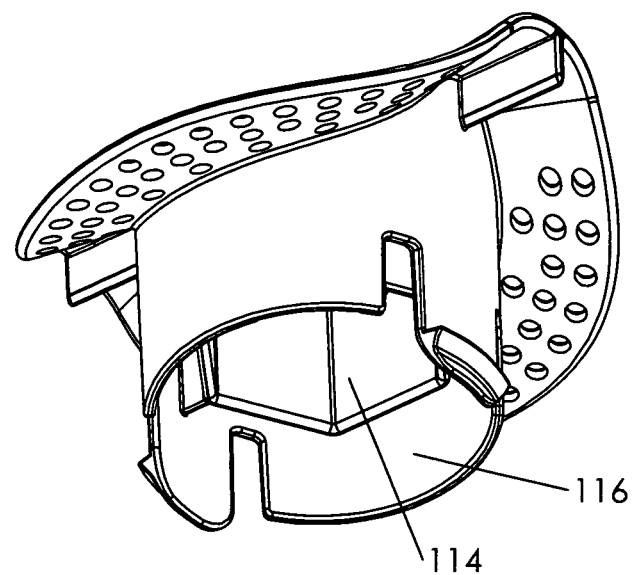
FIG. 25 is a bottom perspective view thereof.
Figure 25:
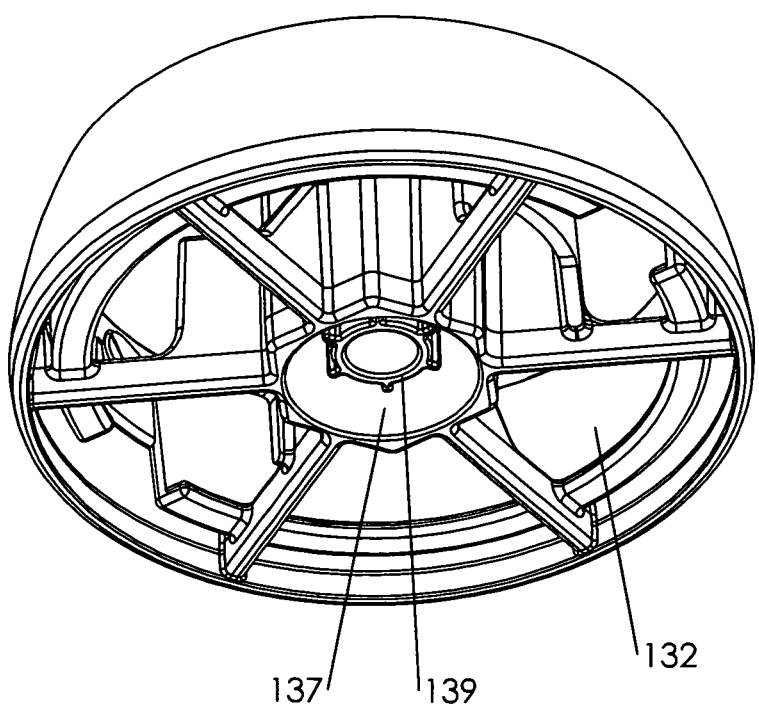
Figure 26:
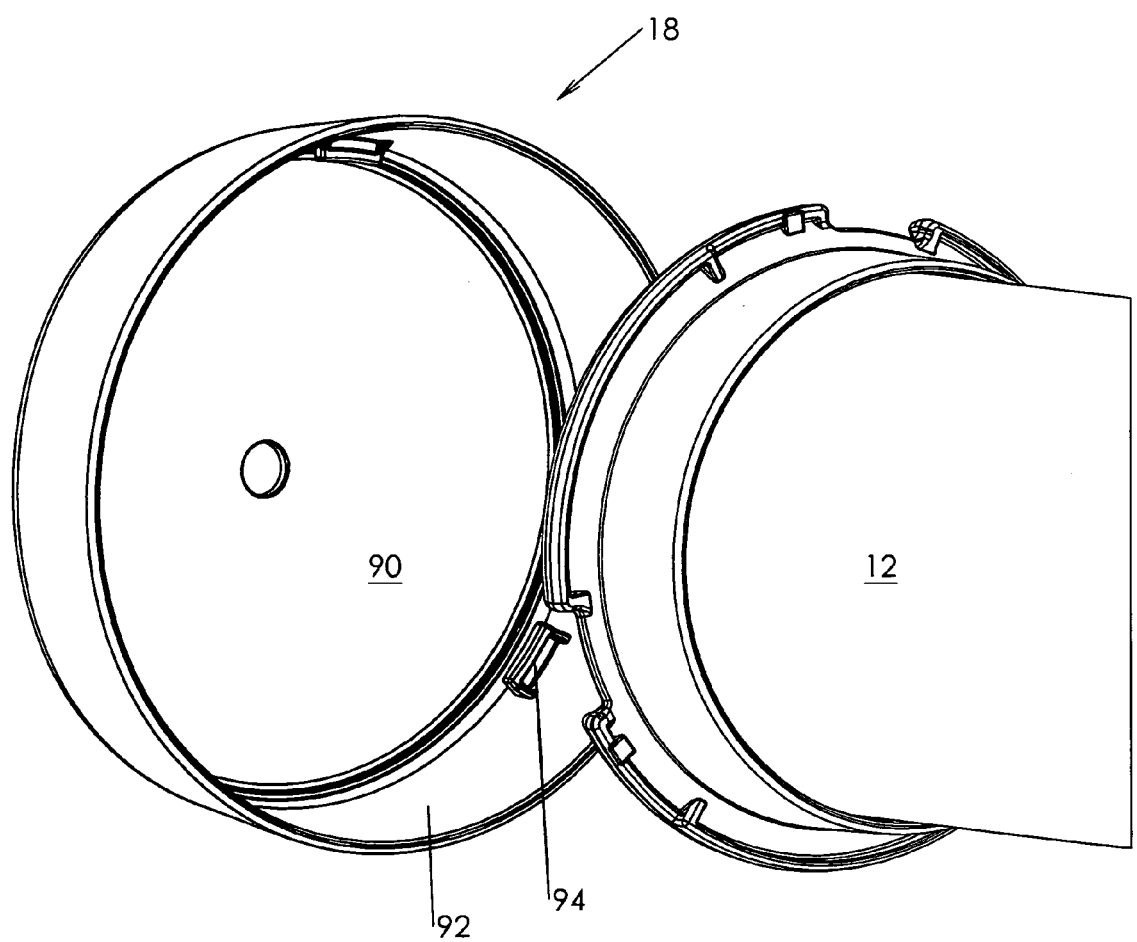
FIG. 26 is a perspective view illustrating the bottom of the cover and the top ring secured to the tube.
Figure 27:
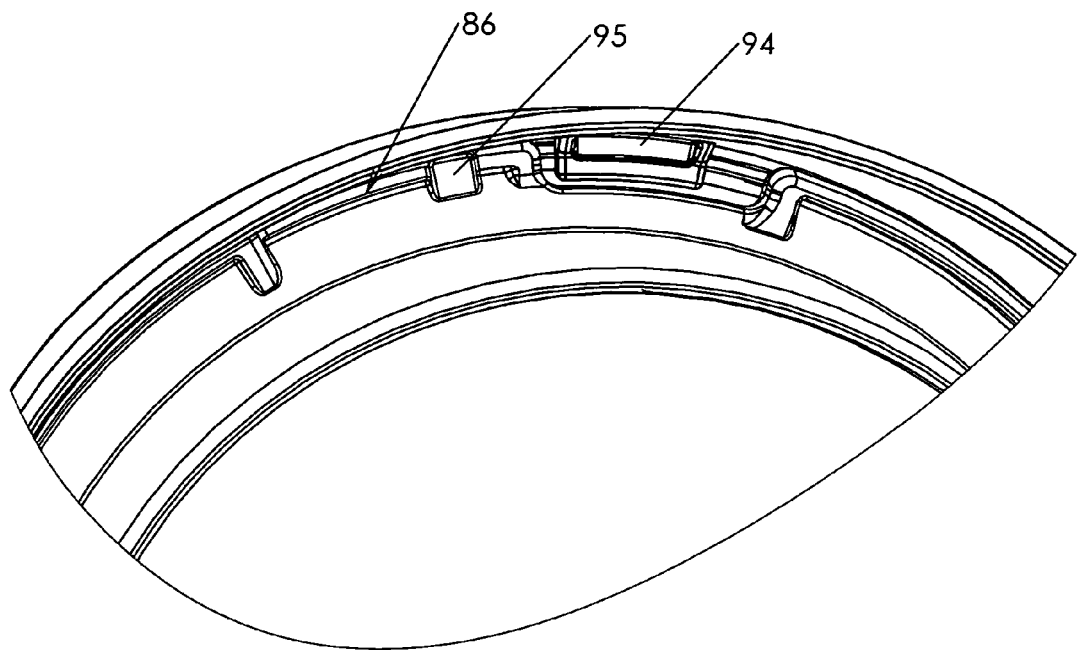
FIGS. 27 to 29 illustrate the locking of the cover to the top ring.
Figure 28:
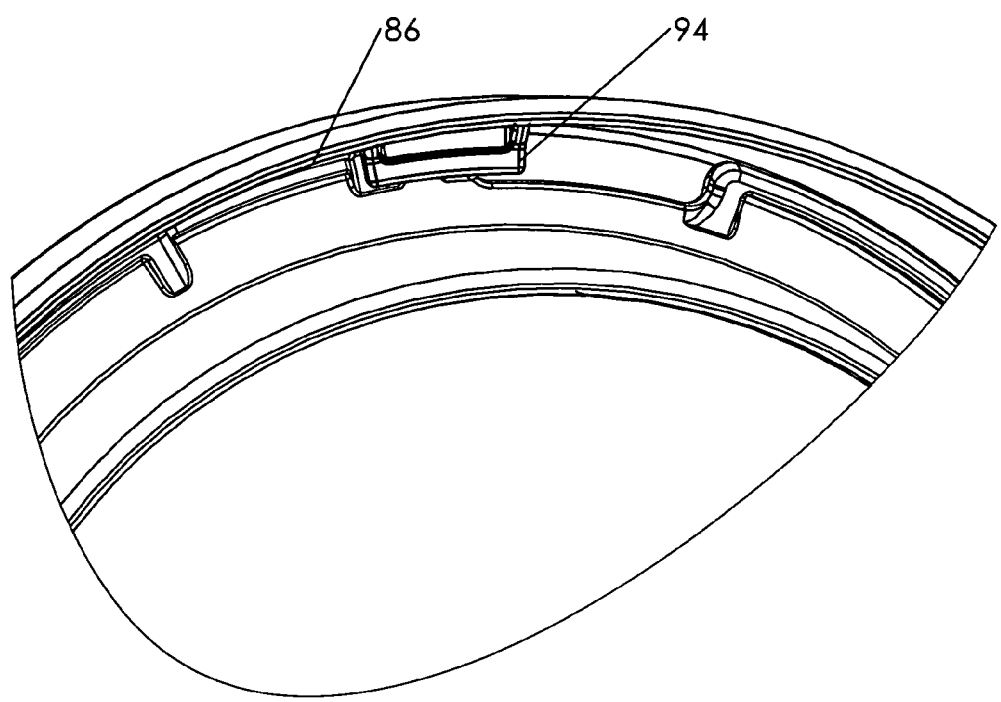
Figure 29:
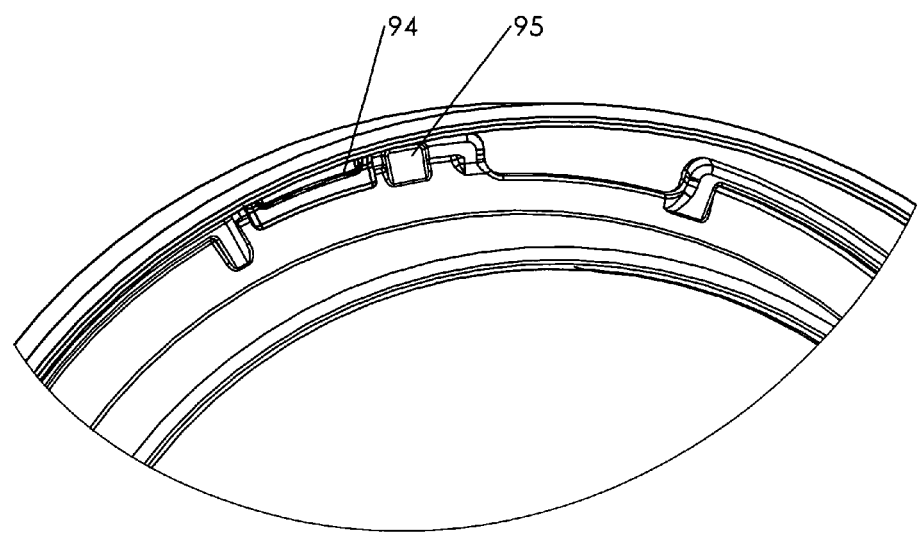
Figure 30:
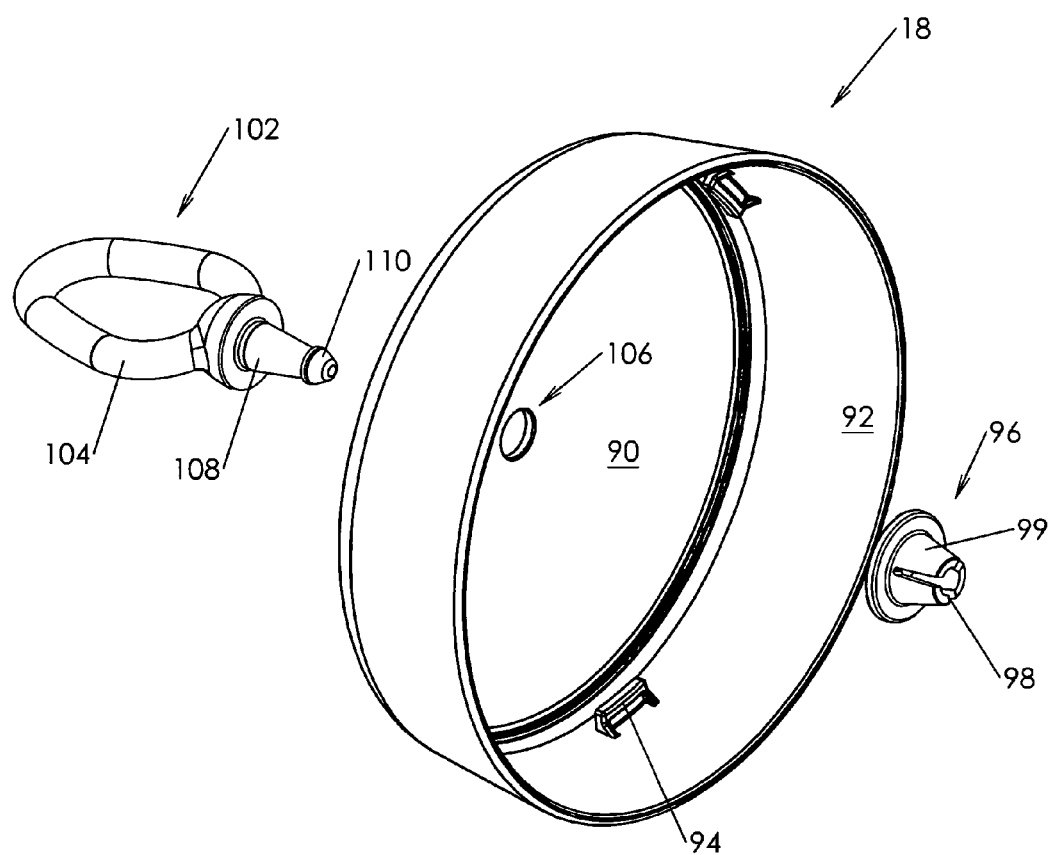
FIG. 30 is a perspective exploded view illustrating the attachment of the bail.
Figure 31:
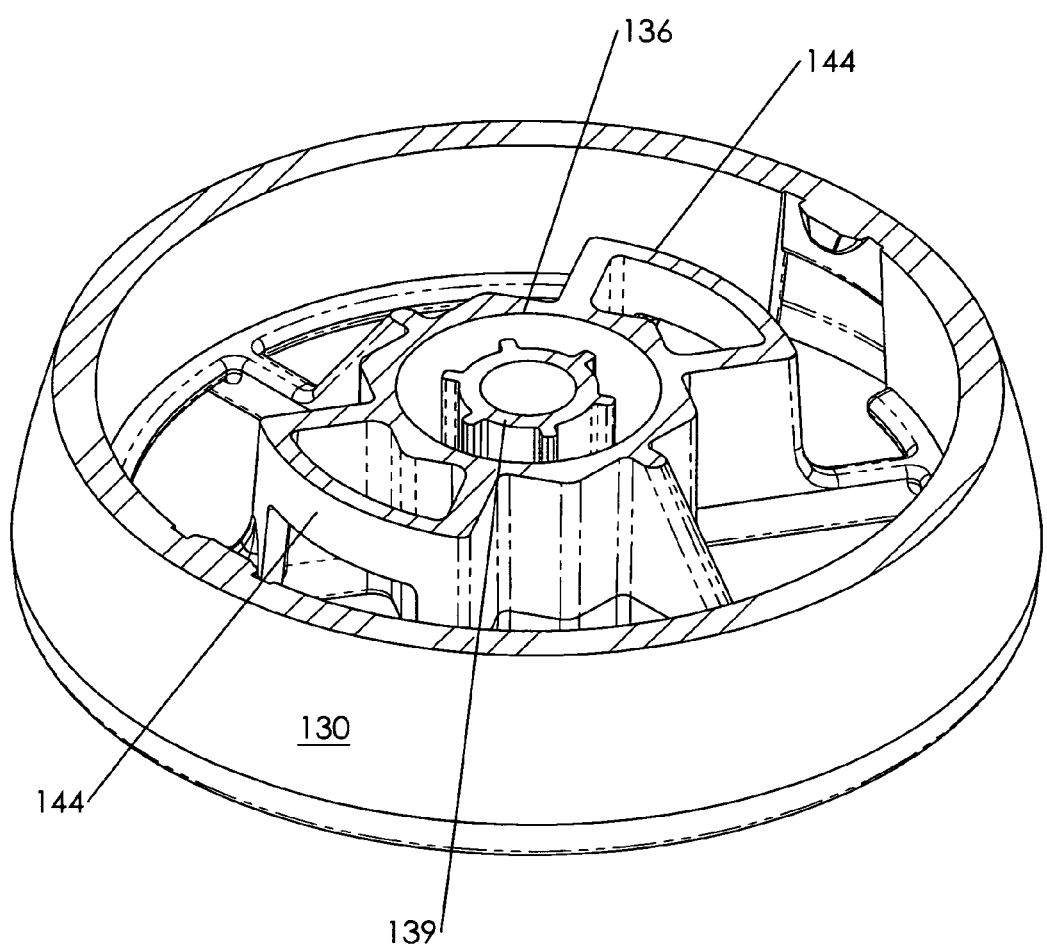
FIG. 31 is a perspective view of the bottom portion of the base.
Figure 32:
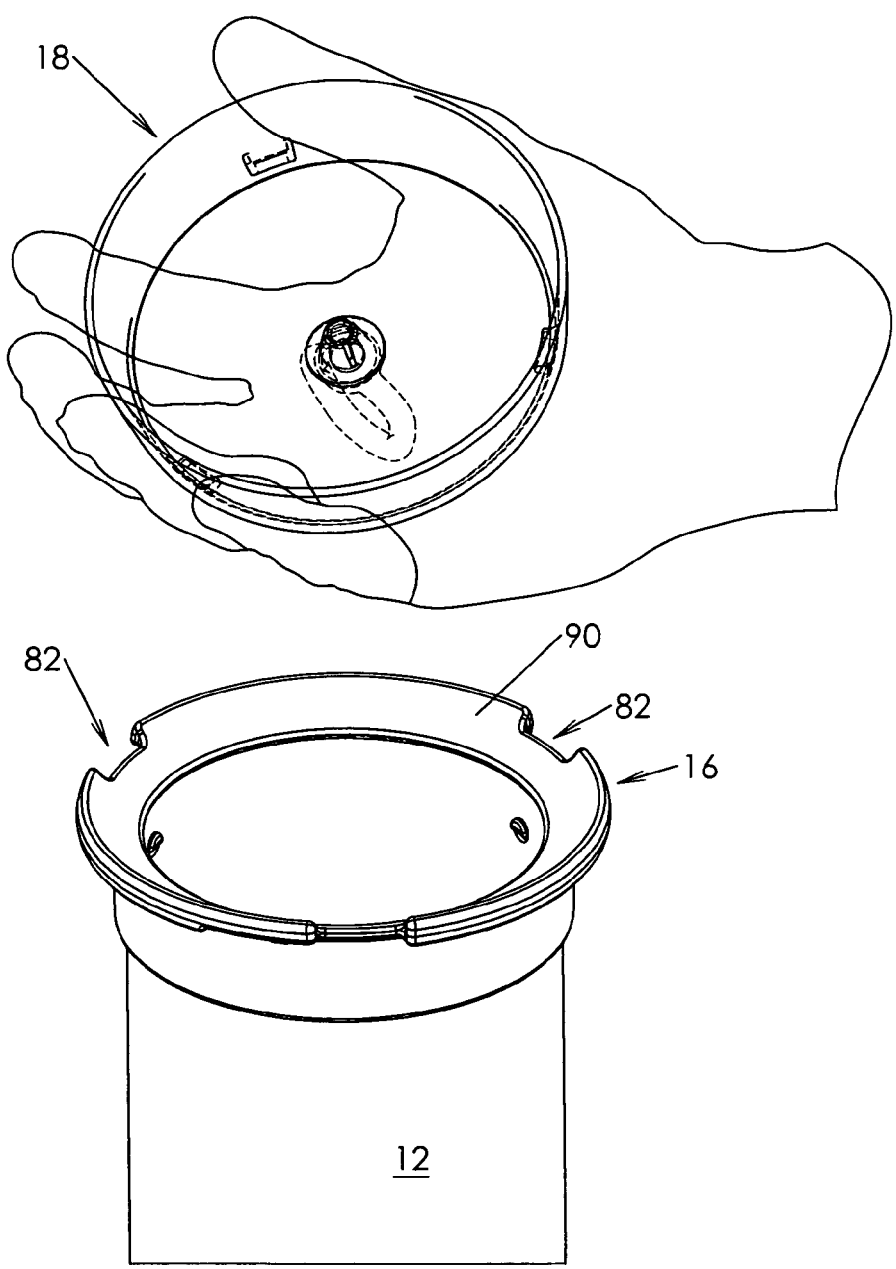
FIG. 32 is a perspective view illustrating potential use of the cover as a scoop for placing seeds in the seed tube.

For assembly purposes, the perch 24 is inserted when oriented sideways such that lugs or projections 66, 68 may pass through recesses 38 and 40. The perch is then rotated through 90° to assume the position shown in FIG. 22. In this position, locking lug 70 fits within recess 38 to lock the perch 24 in position.

Top ring 16 has a side wall 74 which extends downwardly over a portion of side wall 14 adjacent upper marginal edge 15. A plurality of projections 76 project inwardly from side wall 74 and are designed to engage top apertures 41 in side wall 14 of tubular body 12. Top ring 16 also includes an upper flange 78 which has a downwardly extending sloping surface 80 which functions as a funnel to help ensure that seeds go inwardly of the tubular body 12 and at the same time, acts as a stop for placement of the ring on the seed tube.

A plurality of cutouts or openings 82 are formed in the outer edge of upper flange 78 for reasons which will be discussed hereinbelow. Adjacent each cutout or opening 82 is a recess 86 formed within flange lower surface 84. Pressure bumps 95 ensure that the cover is held in position.

Cover 18 has a top wall 90 and a downwardly extending side wall 92. Formed on an interior surface of downwardly extending side wall 92 are three lugs or projections 94. These lugs or projections 94 are designed to fit through recess or cutouts 82, pass over locking bumps 95 and engage within recesses 86 when the cover is rotated to thereby latch the cover in position.

A locking cone is generally designated by reference numeral 96. A plurality of slots 98 are formed in cone 96 to provide flexibility thereto by forming a plurality of segments 99.

A hanger or bail 102 includes a hook portion 104. Hook portion 104 has a downwardly extending leg 108 with an enlarged end portion 110. The arrangement is such that leg 108 may be inserted in an aperture 106 formed in top wall 90. Enlarged portion 110 will pass through and lock with locking cone 96. Thus, the hanger 102 is locked in position while still being capable of rotating.

Base 22 includes an upper base portion generally designated by reference numeral 112. Upper base portion 112 includes a downwardly extending inner side wall 114 having a hexagonal configuration. An outer side wall 116 surrounds inner side wall 114 and outer side wall 116 includes a pair of tabs 118 each having an outwardly extending flange or projection 120 at the bottom thereof.

Upper base portion 112 has a pair of half sloping walls 122, 124 forming the upper surface thereof and each having respective drainage and ventilation apertures 126, 128 formed therein.

A lower base portion 129 has an outer cylindrical wall 130 and an inner side wall 132. At the base of inner side wall 132 there is provided an inwardly extending flange 134 which acts as a stopper for the tubular body.

Figure 19:
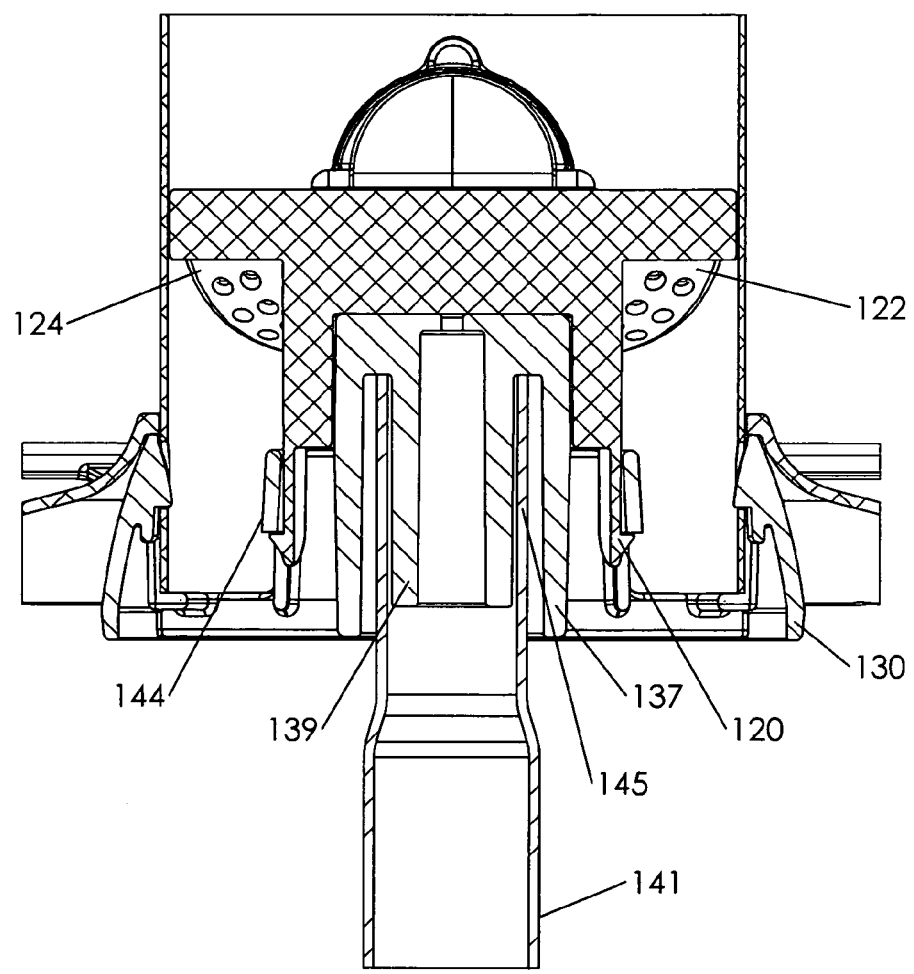
FIG. 19 is an enlarged side sectional view of the bird feeder mounted on the swaged end of a post.
Figure 20:
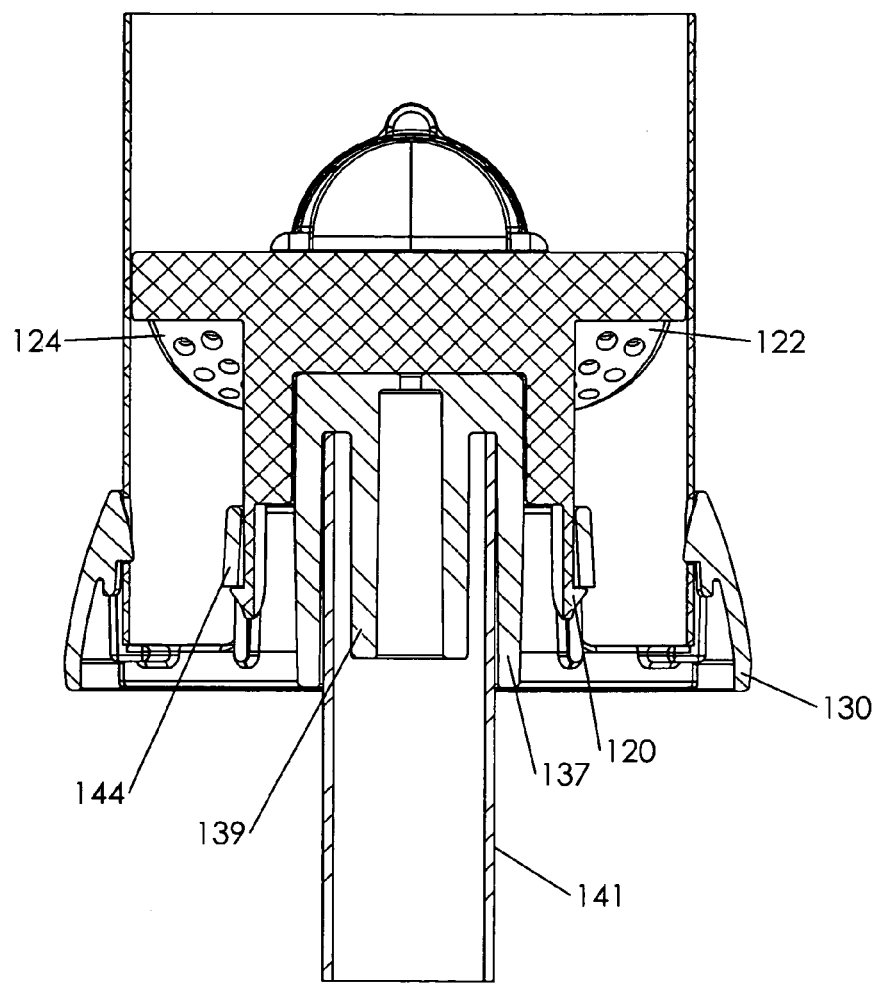
FIG. 20 is a side sectional view similar to FIG. 19 of the feeder mounted on the larger end of a post.
Figure 21:
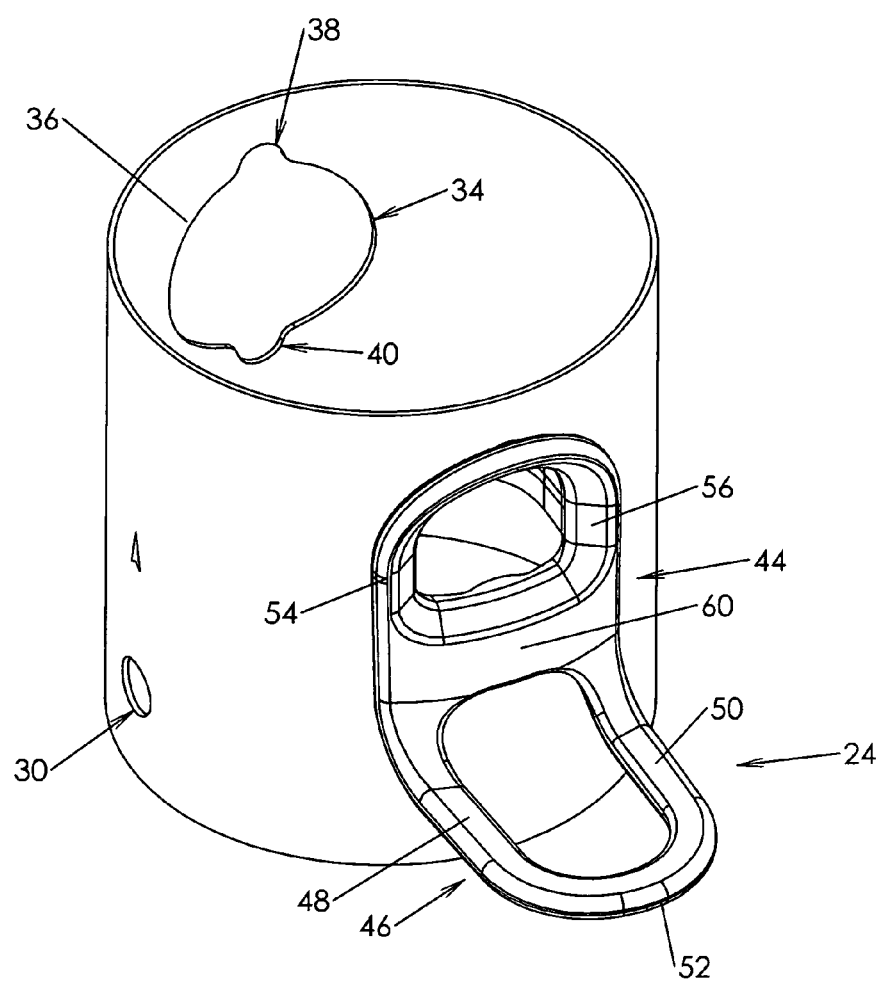
FIG. 21 is a perspective view of the perch and its attachment to the seed tube.

Interiorly of inner side wall 132 is a central hexagonal structure 136 which is designed to fit within the hexagonally shaped inner side wall 114. The hexagonal configuration prevents relative rotation of the lower base portion 129 and the upper base portion 112. The interior of hexagonal shaped inner side wall is circular in configuration and is designed to receive a post. Interiorly of inner wall 137 is an inner post 139 which is arranged to center a post upon which the bird feeder may be mounted. Thus, as shown in FIGS. 17 to 21, several possibilities are provided for. A post 141 may either have a swaged end 145 inserted therein or the wider end as desired. Thus, as shown in FIG. 19, a swaged end 145 is inserted and is supported by inner post 139. In a different arrangement, as shown in FIG. 20, post 141 is designed to fit within and be supported by inner wall 137.

Mounted on inner side wall 132 are a pair of projections 138. Each projection is substantially identical and thus only one will be described herein. Projection 138 has a tapering face or front wall 140. Tapering face 140 tapers outwardly as it extends downwardly and also has a slight taper to either side. This taper permits the insertion of side wall 14 of tubular body 12 due to the flexibility of side wall 14. After insertion and abutting stopper 134, the tubular body may be rotated such that projections 138 will engage within apertures 30, 32. The tubular body 12 is then locked into position.

Lower base portion 129 also includes walls 144 which are designed to receive tabs 118 and be locked into position through projections 120 engaging the bottom of walls 144.

In one embodiment of the invention, there is provided a seed tray 148. Seed tray 148 has a bottom sloping wall 150. Bottom sloping wall 150 has an inner portion 156 and an outer side wall 152. Drainage apertures 154 are provided at the low point of sloping bottom wall 150 which is adjacent outer side wall 152.

Exteriorly of outer side wall 152 there is provided a ring 158 which functions as a perch. Connecting portions 160 are provided as may be seen in the drawings.

Seed tray 148 has a central aperture which is designed to fit over tubular body 12. Seed tray 148 is retained between the bottom of perches 24, 26 and the upper portion of base 22.

As will be seen from the above, bird feeder 10 may be assembled and disassembled without the use of any tools. Top ring 16 reinforces the upper portion of the tubular body 10 permitting the use of thinner (and more flexible) material.

As may be seen in FIG. 33, cover 18 may be used as a scoop for dipping into the bird feed and pouring the same into the seed tube. The tube bird feeder, due to its structure, has ventilation and drainage apertures both at the top and bottom to allow for the exit of hot air.

It will be understood that the above described embodiment is for purposes of illustration only and that changes and modifications may be made thereto without departing from the spirit and scope of the invention.

I claim:

1. A tube bird feeder comprising:
a seed tube having a side wall, at least one feed opening in said side wall, said side wall having a top marginal edge and a bottom marginal edge;
a top ring mounted on said top marginal edge;
a cover removably engaged with said top ring;
at least one perch mounted on said seed tube wall proximate said feed opening; and
a base member removably secured to said seed tube adjacent said bottom marginal edge, said base member having a protrusion, an aperture formed in said seed tube wall proximate said bottom marginal edge and spaced from said at least one feed opening said protrusion engaging with said aperture.

2. The tube bird feeder of claim 1 wherein said top ring has a top ring side wall extending downwardly coextensively with a portion of said seed tube wall.

3. The tube bird feeder of claim 2 wherein said seed tube wall is formed of a flexible plastic material.

4. The tube bird feeder of claim 3 wherein said top ring has a plurality of protrusions thereon, said seed tube wall having a plurality of recesses proximate said top marginal edge, the arrangement being such that said protrusions fit within said recesses to maintain said top ring side wall in position exteriorly of said seed tube wall.

5. The tube bird feeder of claim 4 wherein said protrusions have a tapered front wall to permit placement of said ring over said seed tube wall.

6. The tube bird feeder of claim 4 wherein said ring has an upwardly and outwardly extending flange.

7. The tube bird feeder of claim 6 wherein said flange includes a sloping top wall to provide a funnel like configuration.

8. The tube bird feeder of claim 6 wherein said upwardly and outwardly extending flange includes a plurality of cutouts formed in a side marginal edge thereof.

9. The tube bird feeder of claim 8 further including at least one undercut in said flange adjacent each of said cutouts.

10. The tube bird feeder of claim 9 wherein said cover comprises a top wall and a side wall, said side wall having a plurality of protrusions, each of said protrusions being designed to fit through a corresponding cutout and engage with a corresponding undercut to thereby latch said cover in position.

11. The tube bird feeder of claim 10 wherein said cover has a downwardly extending structure from a lower surface of said top wall;
a bail having a hook portion and a leg, said leg being sized and configured to pass through an opening in said top wall and be retained by said downwardly extending structure in a manner such that said bail cannot be removed while permitting rotatable movement thereof.

12. The tube bird feeder of claim 3 wherein said base has an inner bottom wall to support seed placed in said feed tube, said bottom wall having a raised central portion and downwardly sloping side portions to thereby direct food outwardly towards said seed tube wall.

13. The tube bird feeder of claim 12 further including a plurality of drainage and ventilation apertures formed in said bottom wall of said base, said tube bird feeder also having ventilation openings proximate a top end thereof.

14. The tube bird feeder of claim 12 wherein said base member includes a side wall, said side wall being arranged to be coextensive with a portion of said bottom marginal edge of said seed tube, said side wall having said protrusion extending outwardly therefrom, said protrusion being designed to fit within said aperture.

15. The tube bird feeder of claim 1 wherein said protrusion on said base member has a sloping front wall, the sloping front wall tapering outwardly from a top towards the bottom thereof.

16. The tube bird feeder of claim 1 wherein said base member includes a stopper, said stopper aligning said aperture formed in said seed tube wall proximate said bottom marginal edge with said protrusion on said base member.

17. The tube bird feeder of claim 14 wherein said base comprises an upper base portion and a lower base portion, said upper base portion including said inner bottom wall, said lower base portion having a center structure, said center structure having a wall surrounding a recess, said recess being sized to receive one end of a mounting pole, said recess having a cylindrical element therein to receive a second end of said mounting pole.

18. The tube bird feeder of claim 17 wherein said base includes a plurality of ribs extending between said center structure and said side wall.

19. The tube bird feeder of claim 1 further including a seed tray to catch spilled seeds, said seed tray being retained in position between said base and said at least one perch, said seed tray having a central aperture to permit passage therethrough of said seed tube.

20. The tube bird feeder of claim 19 wherein said seed tray has a seed tray bottom wall, said seed tray bottom wall sloping downwardly from an inner portion to an outer portion, said seed tray having drainage apertures formed therein.

* * * * *